United States Patent
Kim et al.

(10) Patent No.: US 11,693,574 B2
(45) Date of Patent: Jul. 4, 2023

(54) METHOD OF WRITING DATA IN STORAGE DEVICE AND STORAGE DEVICE PERFORMING THE SAME

(71) Applicant: SAMSUNG ELECTRONICS CO., LTD., Suwon-si (KR)

(72) Inventors: Jinwoo Kim, Suwon-si (KR); Dongmin Kim, Hwaseong-si (KR); Youngeun Kim, Hwaseong-si (KR); Jimin Ryu, Hwaseong-si (KR); Yongsoo Jang, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 17/394,801

(22) Filed: Aug. 5, 2021

(65) Prior Publication Data
US 2022/0222003 A1 Jul. 14, 2022

(30) Foreign Application Priority Data
Jan. 11, 2021 (KR) .................. 10-2021-0003270

(51) Int. Cl.
*G06F 3/06* (2006.01)
(52) U.S. Cl.
CPC .......... *G06F 3/0644* (2013.01); *G06F 3/0605* (2013.01); *G06F 3/0673* (2013.01)
(58) Field of Classification Search
CPC .... G06F 3/0644; G06F 3/0605; G06F 3/0673; G06F 3/061; G06F 3/0659; G06F 12/0246; G06F 3/0679; G06F 3/0604; G06F 3/0614; G06F 3/0652; G11C 16/10
See application file for complete search history.

(56) References Cited

U.S. PATENT DOCUMENTS

| | | | |
|---|---|---|---|
| 7,873,782 B2 | 1/2011 | Terry et al. | |
| 9,141,528 B2 | 9/2015 | Gorobets et al. | |
| 9,176,864 B2 | 11/2015 | Gorobets et al. | |
| 9,886,383 B2 | 2/2018 | Cohen et al. | |
| 10,514,864 B2 | 12/2019 | Cohen et al. | |
| 10,592,162 B2 | 3/2020 | Peterson et al. | |
| 2012/0297121 A1 | 11/2012 | Gorobets et al. | |
| 2016/0313943 A1* | 10/2016 | Hashimoto | G06F 3/0643 |
| 2018/0276115 A1* | 9/2018 | Shoji | G11C 8/16 |
| 2018/0307521 A1 | 10/2018 | Pinto | |
| 2020/0110536 A1 | 4/2020 | Navon et al. | |
| 2020/0150899 A1* | 5/2020 | Kim | G06F 3/0656 |

FOREIGN PATENT DOCUMENTS

KR 10-1751571 B1 7/2017
KR 10-2020-0053204 A 5/2020

* cited by examiner

*Primary Examiner* — Zhuo H Li
(74) *Attorney, Agent, or Firm* — Sughrue Mion, PLLC

(57) ABSTRACT

A method of writing data in a storage device is provided. The method includes: receiving an identifier information request; outputting information indicating a plurality of identifiers based on the identifier information request; receiving a first write command and first data, the first write command comprising a first identifier among the plurality of identifiers; performing a data write operation on the first data based on the first write command; receiving a first attribute assignment command comprising the first identifier and a first attribute among a plurality of attributes; and assigning the first attribute to the first data that is already stored in the storage device based on the first attribute assignment command.

19 Claims, 26 Drawing Sheets

FIG. 9

| | | | | |
|---|---|---|---|---|
| 0 xx010110b | 1 Flags | 2 Reserved | 3 Task Tag | |
| 4 Reserved | 5 Query Function | 6 Reserved | 7 Reserved | |
| 8 Total EHS Length(00h) | 9 Reserved | 10 (MSB) Data Segment Length | 11 (LSB) | |
| 12 | 13 Transaction Specific Fields | 14 | 15 | ← FR1 |
| 16 | 17 Transaction Specific Fields | 18 | 19 | |
| 20 | 21 Transaction Specific Fields | 22 | 23 | |
| 24 | 25 Transaction Specific Fields | 26 | 27 | |
| 28 | 29 Reserved | 30 | 31 | |
| | Header E2ECRC(omit if HD=0) | | | |
| k Data[0] | k+1 Data[1] | k+2 Data[2] | k+3 Data[3] | |
| k+Length-4 Data[Length-4] | ... | k+Length-2 Data[Length-2] | k+Length-1 Data[Length-1] | |
| Data E2ECRC(omit if HD=0) | | | | |

QUERY REQUEST UPIU

FIG. 10A

| | | | | |
|---|---|---|---|---|
| | | | QUERY RESPONSE UPIU | |
| 0 | xx110110b | 1 Flags | 2 Reserved | 3 Task Tag |
| 4 | Reserved | 5 Query Function | 6 Query Response | 7 Reserved |
| 8 | Total EHS Length(00h) | 9 Device Information | 10 (MSB) Data Segment Length | 11 (LSB) |
| 12 | | 13 | 14 Transaction Specific Fields | 15 | ← FR21
| 16 | | 17 | 18 Transaction Specific Fields | 19 | ← FR23
| 20 | | 21 | 22 Transaction Specific Fields | 23 |
| 24 | | 25 | 26 Transaction Specific Fields | 27 |
| 28 | | 29 | 30 Reserved | 31 |
| | | | Header E2ECRC(omit if HD=0) | |
| k | Data[0] | k+1 Data[1] | k+2 Data[2] | k+3 Data[3] | ← FR22
| ... | ... | ... | ... | ... |
| k+Length-4 Data[Length-4] | | k+Length-3 Data[Length-3] | k+Length-2 Data[Length-2] | k+Length-1 Data[Length-1] |
| | | | Data E2ECRC(omit if HD=0) | |

| GEOMETRY DESCRIPTOR ||||| 
|---|---|---|---|---|
| Offset | Size | Name | Value | Description |
| 57h | 1 | bMaxNumIdentifier | Device specific | NOI |

| Attributes |||||||
|---|---|---|---|---|---|---|
| IDN | Name | Access Property | Size | Type/#ind/#sel | MDV | Description |
| 2Bh | wIdListBitmap | Read only | 2 | D | 0 | LIST1 |

FIG. 13

| Bit Byte | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT = 000b | | | DPO | FUA | Reserved | FUA_NV = 0b | Obsolete |
| 2 | (MSB) | | | | | | | |
| 3 | LOGICAL BLOCK ADDRESS | | | | | | | |
| 4 | | | | | | | | |
| 5 | | | | | | | | (LSB) |
| 6 | FR31 Identifier | | | | | | | |
| 7 | (MSB) | | | GROUP NUMBER TRANSFER LENGTH | | | | |
| 8 | | | | | | | | (LSB) |
| 9 | CONTROL = 00h | | | | | | | |

METHOD OF WRITING DATA IN STORAGE DEVICE AND STORAGE DEVICE PERFORMING THE SAME

CROSS-REFERENCE TO RELATED APPLICATION

This application claims priority from Korean Patent Application No. 10-2021-0003270 filed on Jan. 11, 2021 in the Korean Intellectual Property Office, the disclosure of which is incorporated herein by reference in its entirety.

BACKGROUND

1. Field

Methods, apparatuses and systems consistent with example embodiments relate generally to semiconductor integrated circuits, and more particularly to methods of writing data in storage devices, and storage devices performing the methods of writing data.

2. Description of Related Art

One or more semiconductor memory devices may be used in data storage devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Various systems, e.g., a laptop computer, a car, an airplane, a drone, etc., have adopted the SSDs for data storage.

Recently, to improve or increase the performance and/or lifetime of the storage device, various schemes of assigning input/output (I/O) attributes to data to be written into the storage device and managing the I/O attributes have been researched.

SUMMARY

At least one example embodiment provides a method of writing data in a storage device capable of assigning an input/output (I/O) attribute later for data that has already been written.

At least one example embodiment provides a storage device performing the method of writing data.

According to an aspect of an example embodiment, a method of writing data in a storage device includes: receiving an identifier information request; outputting information indicating a plurality of identifiers based on the identifier information request; receiving a first write command and first data, the first write command including a first identifier among the plurality of identifiers; performing a data write operation on the first data based on the first write command; receiving a first attribute assignment command including the first identifier and a first attribute among a plurality of attributes; and assigning the first attribute to the first data that is already stored in the storage device based on the first attribute assignment command.

According to an aspect of an example embodiment, a storage device includes a plurality of nonvolatile memories; and a storage controller configured to: receive an identifier information request from a host device that external to the storage device, output information, to the host device, indicating a plurality of identifiers based on the identifier information request, receive, from the host device, a first write command including a first identifier among the plurality of identifiers and first data, perform a data write operation on the first data based on the first write command, receive, from the host device, a first attribute assignment command including the first identifier and a first attribute among a plurality of attributes, and assign the first attribute to the first data that is already stored in the storage device based on the first attribute assignment command.

According to an aspect of an example embodiment, a method of writing data in a storage device includes: receiving a first query request from a host device that is external to the storage device; outputting a maximum identifier number to the host device based on the first query request, the maximum identifier number representing a quantity of a plurality of identifiers that are used in the storage device to assign a plurality of attributes to a plurality of data; receiving a second query request from the host device; outputting an attribute determination expectation identifier list to the host device based on the second query request, the attribute determination expectation identifier list including the plurality of identifiers and information indicating whether each of the plurality of identifiers is available; receiving a first write command and first data from the host device, the first write command including a first identifier among the plurality of identifiers; performing a data write operation to store the first data into a first region of the storage device corresponding to a first logical address based on the first write command; recording the first logical address to an attribute determination expectation stream information list in association with the first identifier, the attribute determination expectation stream information list indicating a relationship between the plurality of identifiers and a plurality of logical addresses to which the plurality of identifiers are assigned; receiving a subsequent command from the host device, the subsequent command including the first identifier and a first attribute among the plurality of attributes; assigning the first attribute to the first data that is already stored in the storage device based on the subsequent command; and deleting the first logical address from the attribute determination expectation stream information list. The first attribute of the first data is not set while the data write operation for the first data is performed. The first attribute of the first data is set after the data write operation for the first data is completed and the subsequent command is received. The first identifier in the first write command indicates an attribute of the first data is scheduled to be set after the data write operation for the first data is completed.

According to at least one example embodiment, an attribute of specific data that is already stored in a storage device may be set after a data write operation for the specific data is completed, based on a plurality of identifiers serving as a temporary ID and an additional command which is provided independently, individually and/or separately from the write command. Accordingly, data and corresponding attributes may be efficiently written into the storage device, and performance and/or lifetime of the storage device may be efficiently improved or enhanced.

BRIEF DESCRIPTION OF THE DRAWINGS

The above and other aspects will be more clearly understood from the following description of example embodiments taken in conjunction with the accompanying drawings in which:

FIGS. 8, 9, 10A, 10B, 10C and 10D are diagrams for describing operations of FIG. 7.

FIGS. 12, 13 and 14 are diagrams for describing operations of FIG. 11.

DETAILED DESCRIPTION

Figure 1:
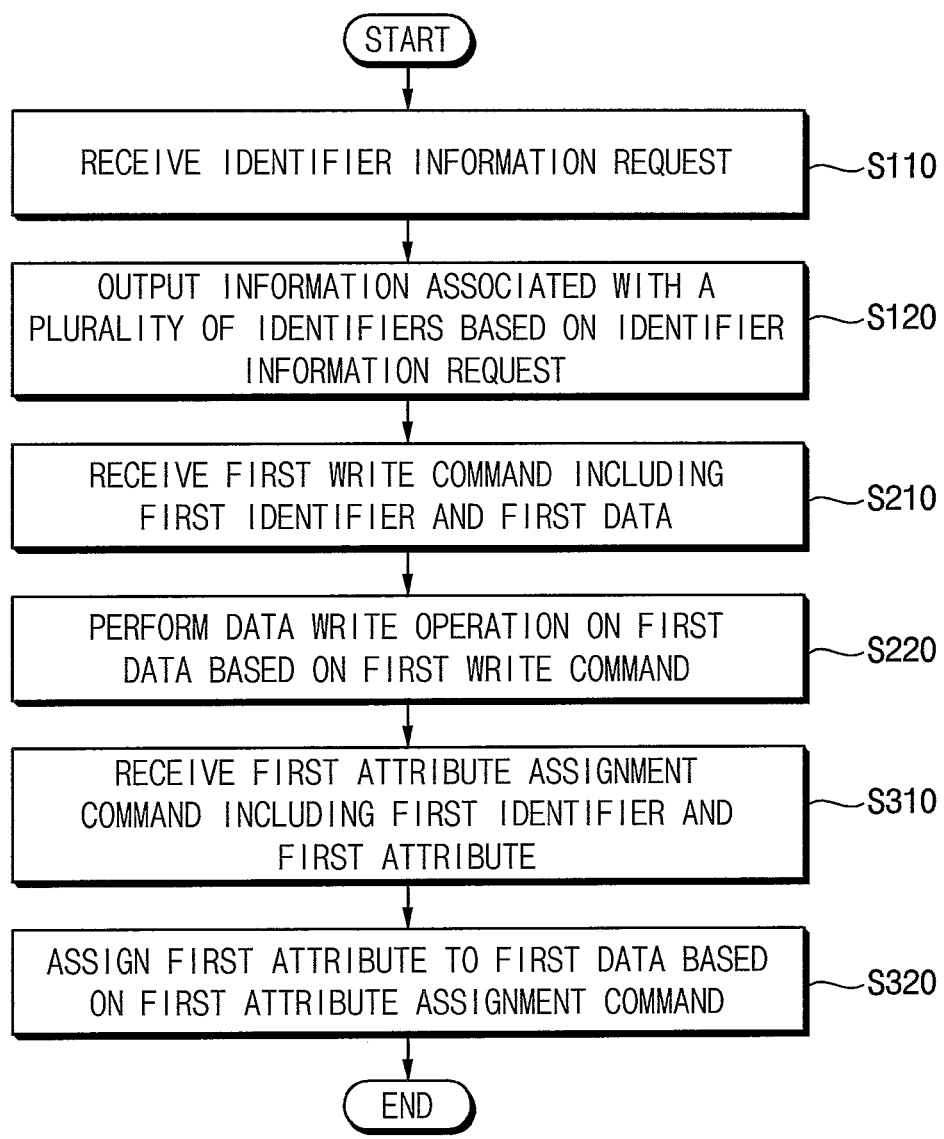
FIG. 1 is a flowchart illustrating a method of writing data in a storage device according to example embodiments.

Example embodiments will be described with reference to the accompanying drawings. The present disclosure may, however, be embodied in many different forms and should not be construed as limited to the example embodiments set forth herein. Like reference numerals refer to like elements throughout this application.

FIG. 1 is a flowchart illustrating a method of writing data in a storage device according to example embodiments.

Referring to FIG. 1, a method of writing data according to example embodiments is performed by a storage device that includes a storage controller and a nonvolatile memory. The storage device operates based on a command received from a host device that is located outside the storage device. Detailed configurations of the storage device and a storage system including the storage device will be described with reference to FIGS. 2 through 6.

In the method of writing data in the storage device according to example embodiments, the storage device receives an identifier information request (or a request for identifier information) from the host device (operation S110). The storage device outputs information associated with a plurality of identifiers to the host device based on the identifier information request (operation S120). The plurality of identifiers are used to assign a plurality of attributes to a plurality of data. For example, operations S110 and S120 may be performed at an initial operation time of the storage device (e.g., when the storage device is powered on or booted). Operations S110 and S120 will be described with reference to FIG. 7.

The storage device receives a first write command and first data from the host device (operation S210). The first write command includes a first identifier among the plurality of identifiers. The storage device performs a data write operation on the first data (or writes the first data) corresponding to the first identifier based on the first write command (operation S220). For example, an attribute of the first data may not be set while the data write operation for the first data is performed, e.g., in operations S210 and S220. The first identifier included in the first write command may represent that the attribute of the first data is scheduled to be set after the data write operation for the first data is completed, and the first data may be recorded to a list that is additionally and separately managed such that the first data corresponds to the first identifier. In other words, the first identifier may serve or function as a temporary identification (ID) until the attribute of the first data is actually set. Operations S210 and S220 will be described with reference to FIG. 11.

The storage device receives a first attribute assignment command from the host device (operation S310). The first attribute assignment command includes the first identifier and a first attribute among the plurality of attributes. The storage device assigns or allocates the first attribute to the first data that is already stored or written in the storage device based on the first attribute assignment command (operation S320). For example, the attribute of the first data may be set to the first attribute after the data write operation for the first data is completed and the first attribute assignment command is received, e.g., in operations S310 and S320. For example, the first attribute may be provided in the form of a first stream ID. Unlike the first identifier that is the temporary ID, the first stream ID may serve or function as a formal ID (or a regular ID) representing an attribute that is actually set for the first data.

In some example embodiments, as will be described with reference to FIG. 15, the first attribute assignment command may be a first confirmation stream command that is defined to have a field configuration different from that of the first write command and used to assign the plurality of attributes to the plurality of data. In other words, an additional and separate command may be newly defined such that an attribute is assigned later to data that is already stored in the storage device according to example embodiments.

In other example embodiments, as will be described with reference to FIG. 20, the first attribute assignment command may be a second write command that is defined to have a field configuration the same as that of the first write command and used to assign the plurality of attributes to the plurality of data. In other words, an existing write command may be modified and used such that an attribute is assigned later to data that is already stored in the storage device according to example embodiments.

In the method of writing data in the storage device according to example embodiments, the attribute of the specific data that is already stored in the storage device may be set after the data write operation for the specific data is completed, based on the plurality of identifiers served as the temporary ID and the additional command provided independently, individually and/or separately from the write command. As such, it is not necessary to assign the attribute of the data at the time of writing, it is not necessary for the storage device to determine the attribute of data the by itself, and the range of opportunities with respect to the time of assigning or transmitting the attribute may be expanded. Accordingly, the data and corresponding attributes may be efficiently written into the storage device, and the performance and/or lifetime of the storage device may be efficiently improved or enhanced based on the attributes.

Figure 2:
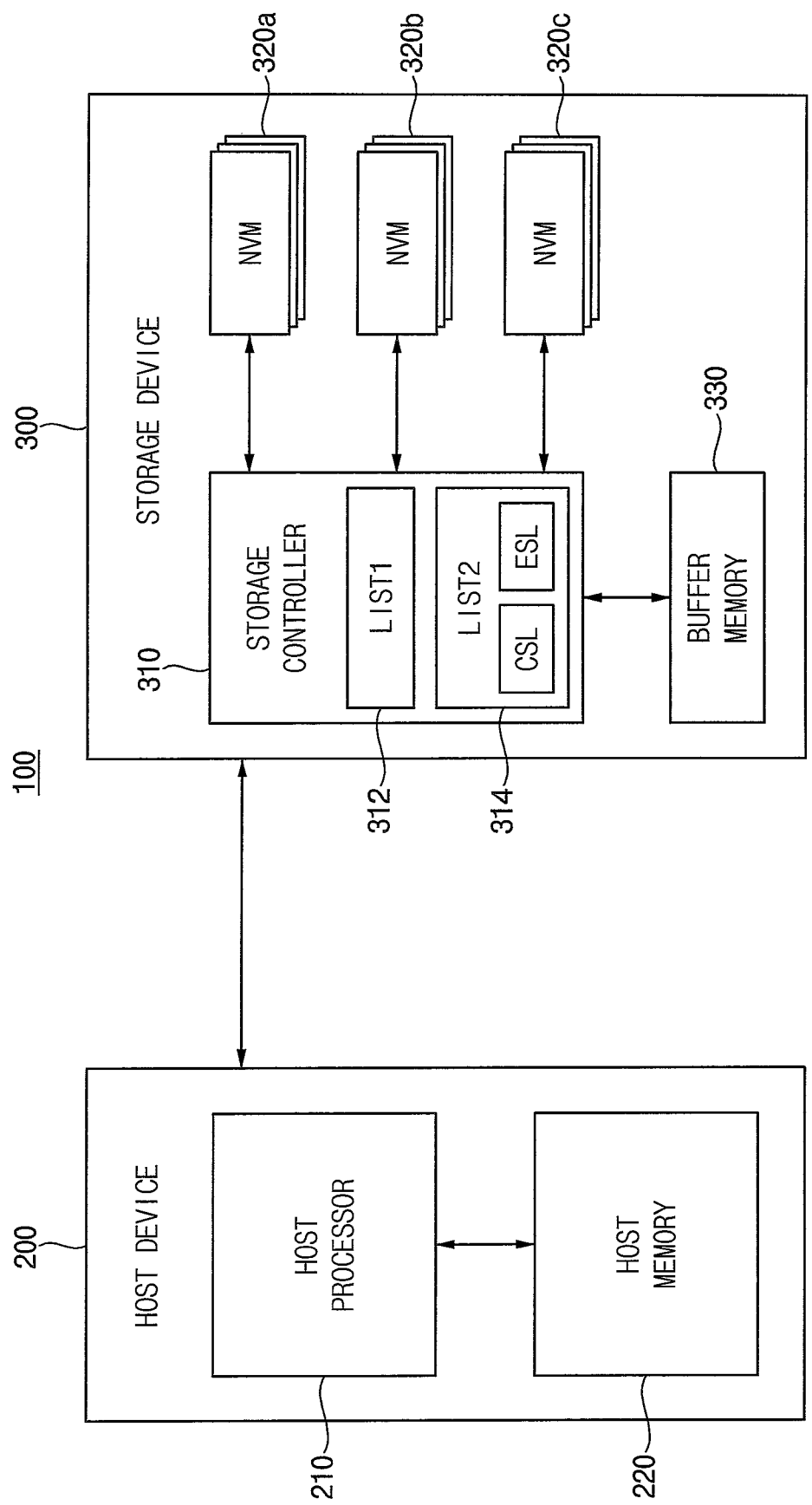
FIG. 2 is a block diagram illustrating a storage device and a storage system including the storage device according to example embodiments.

FIG. 2 is a block diagram illustrating a storage device and a storage system including the storage device according to example embodiments.

Referring to FIG. 2, a storage system 100 includes a host device 200 and a storage device 300.

The host device 200 controls overall operations of the storage system 100. The host device 200 may include a host processor 210 and a host memory 220.

The host processor 210 may control an operation of the host device 200. For example, the host processor 210 may execute an operating system (OS). For example, the operating system may include a file system for file management and a device driver for controlling peripheral devices including the storage device 300 at the operating system level. For example, the host processor 210 may include at least one of various processing units, e.g., a central processing unit (CPU), or the like.

The host memory 220 may store instructions and/or data that are executed and/or processed by the host processor 210. For example, the host memory 220 may include at least one of various volatile memories, e.g., a dynamic random access memory (DRAM), or the like.

The storage device 300 is communicably coupled to the host device 200. The storage device 300 may include a storage controller 310, a plurality of nonvolatile memories 320a, 320b and 320c, and a buffer memory 330.

The storage controller 310 may control an operation of the storage device 300, e.g., a data write operation and/or a data read operation, based on a command and data that are received from the host device 200.

The storage controller 310 may perform the method of writing data according to example embodiments described with reference to FIG. 1. For example, the storage controller 310 may receive an identifier information request from the host device 200, may output information associated with a plurality of identifiers based on the identifier information request, may receive a first write command including a first identifier among the plurality of identifiers and first data from the host device 200, may perform a data write operation on the first data based on the first write command, may receive a first attribute assignment command including the first identifier and a first attribute among a plurality of attributes from the host device 200, and may assign the first attribute to the first data that is already stored in the storage device 300 based on the first attribute assignment command.

The storage controller 310 may include a first list (LIST1) 312 and a second list (LIST2) 314 that are used to perform the method of writing data according to example embodiments described with reference to FIG. 1.

The first list 312 may include or represent the plurality of identifiers and information indicating whether each of the plurality of identifiers is available, and may be a data structure composed of the plurality of identifiers. The first list 312 may be referred to as an attribute determination expectation (or scheduled) identifier list, or more simply, may be referred to as an ID list (or a temporary ID list).

The second list 314 may include or represent a relationship between the plurality of identifiers and a plurality of logical addresses corresponding to a plurality of data, and a relationship between the plurality of attributes and a plurality of logical addresses corresponding to a plurality of data, and may be a data structure composed of meta information for each stream. The second list 314 may be referred to as a stream information list, or more simply, may be referred to as a stream list.

The second list 314 may include a first sub-list CSL and a second sub-list ESL. The first sub-list CSL may include or represent a relationship between the plurality of attributes and a plurality of logical addresses to which the plurality of attributes are assigned. The second sub-list ESL may include or represent a relationship between the plurality of identifiers and a plurality of logical addresses to which the plurality of identifiers are assigned. The first sub-list CSL may be referred to as an attribute determination (or confirmation) stream information list including information on logical addresses whose attributes are determined. The second sub-list ESL may be referred to as an attribute determination expectation (or scheduled) stream information list including information on logical addresses whose attributes are scheduled to be determined.

The plurality of attributes may represent input/output (I/O) characteristics provided by the storage device 300. For example, the plurality of attributes may be divided or classified based on an access frequency of data (or the number of times data is accessed). For example, the plurality of attributes may include access characteristics such as "hot" representing a relatively high level of the access frequency, "cold" representing a relatively low level of the access frequency, "warm" representing a medium level of the access frequency, or the like. For example, the plurality of attributes may be provided in the form of streams or stream IDs.

Streams of attributes that are determined and included in the first sub-list CSL may represent single or multiple data and/or logical addresses whose attributes are specified at the time of writing or after writing. Streams of attributes that are scheduled to be determined and included in the second sub-list ESL may represent single or multiple data and/or logical addresses whose attributes are not specified at the time of writing but the identifiers representing that the attributes are scheduled to be specified later are set. As described below, in operations S310 and S320, some of the streams of which the attributes are scheduled to be determined may be changed, switched and/or converted to the stream of which the attributes are determined.

One identifier may be commonly assigned to streams of which attributes are scheduled to be determined identically. The first list 312, which is the attribute determination expectation identifier list, may be a list of identifiers that can be assigned to the streams of which the attributes are scheduled to be determined, and may include a maximum identifier number that represents a quantity of the plurality of identifiers supported by the storage device 300.

The storage device 300 may determine or set the attributes of data that are already stored in the storage device 300 using the plurality of identifiers, the first list 312 and the second list 314 after the data write operation is completed. However, example embodiments are not limited thereto, and the storage device 300 may perform a data write operation by determining attributes of data at the time of writing, or may perform a data write operation on data without attributes (e.g., data of which the attributes are not determined at the time of writing and after writing).

The plurality of nonvolatile memories 320a, 320b and 320c may store a plurality of data. For example, the plurality of nonvolatile memories 320a, 320b and 320c may store the meta data, various user data, or the like.

In some example embodiments, each of the plurality of nonvolatile memories 320a, 320b and 320c may include a NAND flash memory. In other example embodiments, each of the plurality of nonvolatile memories 320a, 320b and 320c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), a thyristor random access memory (TRAM), or the like.

The buffer memory 330 may store instructions and/or data that are executed and/or processed by the storage controller 310, and may temporarily store data stored in or to be stored into the plurality of nonvolatile memories 320a, 320b and 320c. For example, the buffer memory 330 may include at least one of various volatile memories, e.g., a static random access memory (SRAM), a DRAM, or the like.

In some example embodiments, the storage device 300 may be a universal flash storage (UFS). In other example embodiments, the storage device 300 may be a solid state drive (SSD), a multi-media card (MMC) or an embedded multi-media card (eMMC). In still other example embodiments, the storage device 300 may be one of a secure digital (SD) card, a micro SD card, a memory stick, a chip card, a universal serial bus (USB) card, a smart card, a compact flash (CF) card, or the like.

In some example embodiments, the storage device 300 may be connected to the host device 200 via a block accessible interface which may include, for example, a UFS, an eMMC, a serial advanced technology attachment (SATA) bus, a nonvolatile memory express (NVMe) bus, a serial attached SCSI (SAS) bus, or the like. The storage device 300 may use a block accessible address space corresponding to an access size of the plurality of nonvolatile memories 320a, 320b and 320c to provide the block accessible interface to the host device 200, for allowing the access by units of a memory block with respect to data stored in the plurality of nonvolatile memories 320a, 320b and 320c.

In some example embodiments, the storage system 100 may be any computing system, such as a personal computer (PC), a server computer, a data center, a workstation, a digital television, a set-top box, a navigation system, etc. In other example embodiments, the storage system 100 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Figure 3:
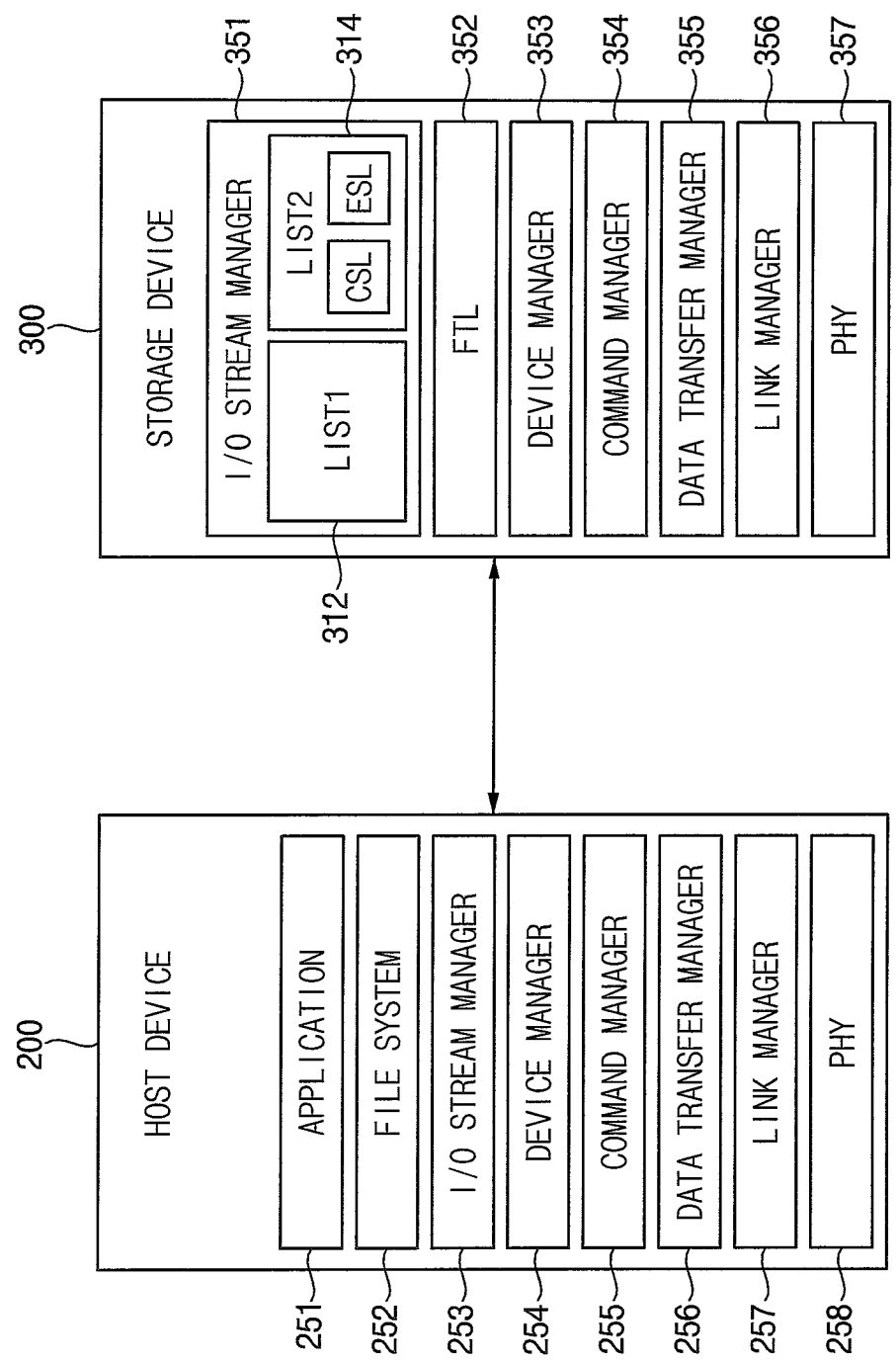
FIG. 3 is a diagram for describing an operation of a storage system according to example embodiments.

FIG. 3 is a diagram for describing an operation of a storage system according to example embodiments. FIG. 3 conceptually illustrates a software hierarchical structure of the host device 200 and the storage device 300 in FIG. 2.

Referring to FIG. 3, the host device 200 may include an application 251, a file system 252, an I/O stream manager 253, a device manager 254, a command manager 255, a data transfer manager 256, a link manager 257 and a physical layer (PHY) 258.

The application 251 may be an application software program that is executed on an operating system. For example, the application 251 has been programmed to aid in generating, copying and deleting a file. For example, the application 251 may provide various services such as a video application, a game application, a web browser application, etc.

The file system 252 may manage files used by the host device 200. For example, the file system 252 may manage file names, extensions, file attributes, file sizes, cluster information, etc. of files accessed by requests from the host device 200 or applications executed by the host device 200. The file system 252 may generate, delete and manage data on a file basis. For example, the file system 252 may be a flash-friendly file system (F2FS).

The I/O stream manager 253 may analyze inputs and outputs received from the application 251 and the file system 252 to classify attributes or characteristics of the inputs and outputs. The device manager 254 may control various devices such as the storage device 300. The command manager 255 may control commands provided to the storage device 300. The data transfer manager 256 may control data transmission. The link manager 257 may control connection to the storage device 300. The physical layer 258 may manage control physical data communication with the storage device 300.

The application 251 and the file system 252 may be referred to as a high level, and the data transfer manager 256, the link manager 257 and the physical layer 258 may be referred to as a low level.

The storage device 300 may include an I/O stream manager 351, a flash translation layer (FTL) 352, a device manager 353, a command manager 354, a data transfer manager 355, a link manager 356 and a physical layer 357.

The I/O stream manager 351 may manage the attributes or characteristics received from the host device 200, and may manage the first list 312 and the second list 314 that are used to perform the method of writing data according to example embodiments. The first list 312 and the second list 314 may be substantially the same as those described with reference to FIG. 2.

The flash translation layer 352 may perform various functions, such as an address mapping operation, a wear-leveling operation, a garbage collection operation, or the like. The address mapping operation may be an operation of converting a logical address received from the host device 200 into a physical address used to actually store data in a nonvolatile memory (e.g., the nonvolatile memories 320a, 320b and 320c in FIG. 2). The wear-leveling operation may be a technique for preventing excessive deterioration of a specific block by allowing blocks of the nonvolatile memory to be uniformly used. As an example, the wear-leveling operation may be implemented using a firmware technique that balances erase counts of physical blocks. The garbage collection operation may be a technique for ensuring usable capacity in the nonvolatile memory by erasing an existing block after copying valid data of the existing block to a new block.

The device manager 353 may handle or treat device management. The command manager 354 may analyze the commands received from the host device 200. The data transfer manager 355 may control data transmission. The link manager 356 may control connection to the host device 200. The physical layer 357 may manage control physical data communication with the host device 200.

The command manager 354 may be referred to as a high level, and the data transfer manager 355, the link manager 356 and the physical layer 357 may be referred to as a low level.

Figure 4:
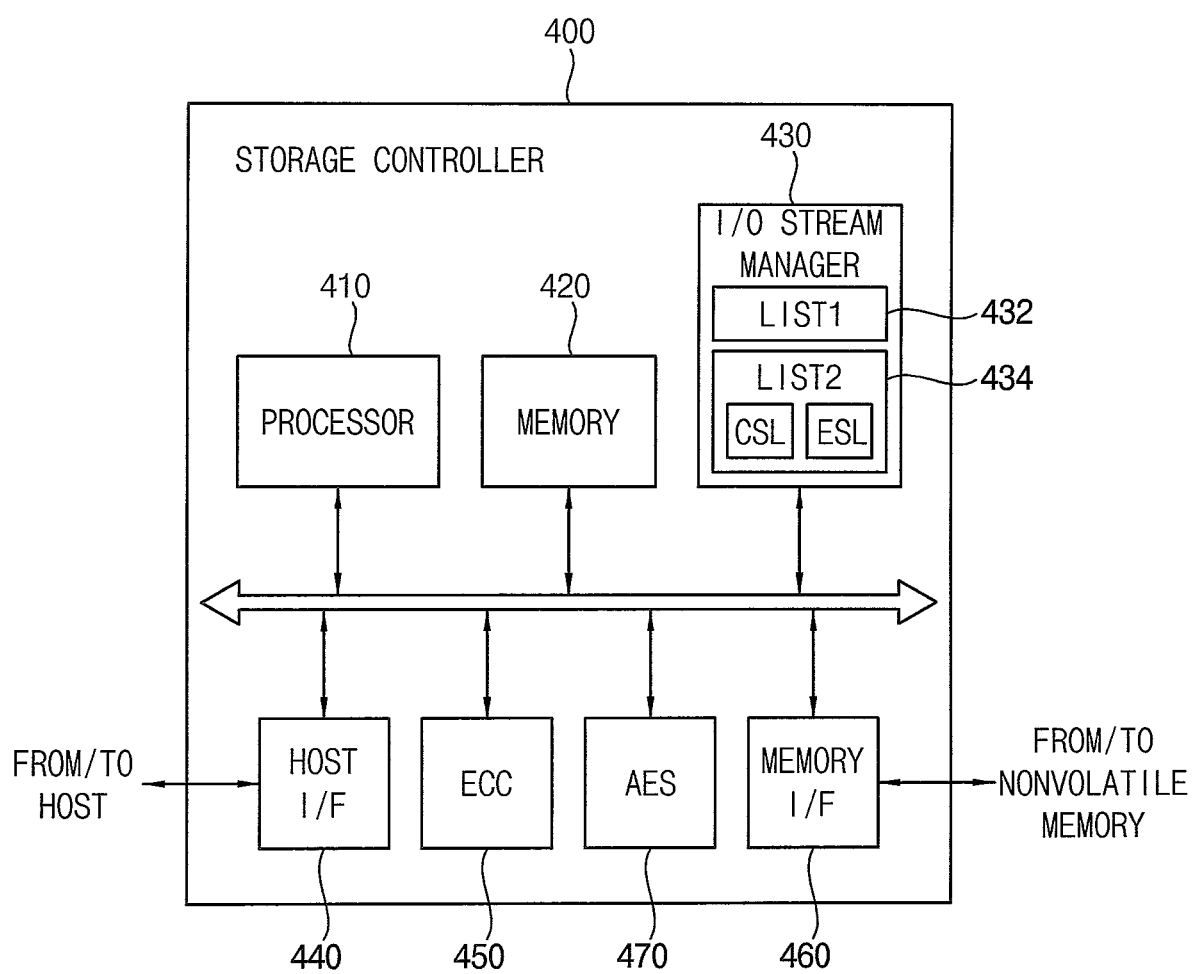
FIG. 4 is a block diagram illustrating an example of a storage controller included in a storage device according to example embodiments.

FIG. 4 is a block diagram illustrating an example of a storage controller included in a storage device according to example embodiments.

Referring to FIG. 4, a storage controller 400 may include a processor 410, a memory 420, an I/O stream manager 430, a host interface 440, an error correction code (ECC) engine 450, a memory interface 460 and an advanced encryption standard (AES) engine 470. For example, the storage controller 400 may correspond to the storage controller 310 in FIG. 2.

The processor 410 may control an operation of the storage controller 400 in response to a command received via the host interface 440 from a host device (e.g., the host device 200 in FIG. 2). For example, the processor 410 may control an operation of a storage device (e.g., the storage device 300 of FIG. 2), and may control respective components by employing firmware for operating the storage device.

The memory 420 may store instructions and data executed and processed by the processor 410. For example, the memory 420 may be implemented with a volatile memory, such as a DRAM, a SRAM, a cache memory, or the like.

The I/O stream manager 430 may manage a first list 432 and a second list 434 that are used to perform the method of writing data according to example embodiments, and may be substantially the same as the I/O stream manager 351 in FIG. 3. In some example embodiments, at least a part of the I/O stream manager 430 may be implemented as hardware. For example, at least a part of the I/O stream manager 430 may be included in a computer-based electronic system. In other example embodiments, at least a part of the I/O stream manager 430 may be implemented as instruction codes or program routines (e.g., a software program). For example, the instruction codes or the program routines may be executed by a computer-based electronic system, and may be stored in any storage device located inside or outside the computer-based electronic system.

The ECC engine 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), an SATA, a nonvolatile memory (NVM) express (NVMe), etc., format.

The memory interface 460 may exchange data with a nonvolatile memory (e.g., the nonvolatile memories 320a, 320b and 320c in FIG. 2). The memory interface 460 may transfer data to the nonvolatile memory, or may receive data read from the nonvolatile memory. In some example embodiments, the memory interface 460 may be connected to the nonvolatile memory via one channel. In other example embodiments, the memory interface 460 may be connected to the nonvolatile memory via two or more channels. For example, the memory interface 460 may be configured to comply with a standard protocol, such as Toggle or open NAND flash interface (ONFI).

The AES engine 470 may perform at least one of an encryption operation and a decryption operation on data input to the storage controller 400 by using a symmetric-key algorithm. The AES engine 470 may include an encryption module and a decryption module. For example, the encryption module and the decryption module may be implemented as separate modules. For another example, one module capable of performing both encryption and decryption operations may be implemented in the AES engine 470.

Figure 5:
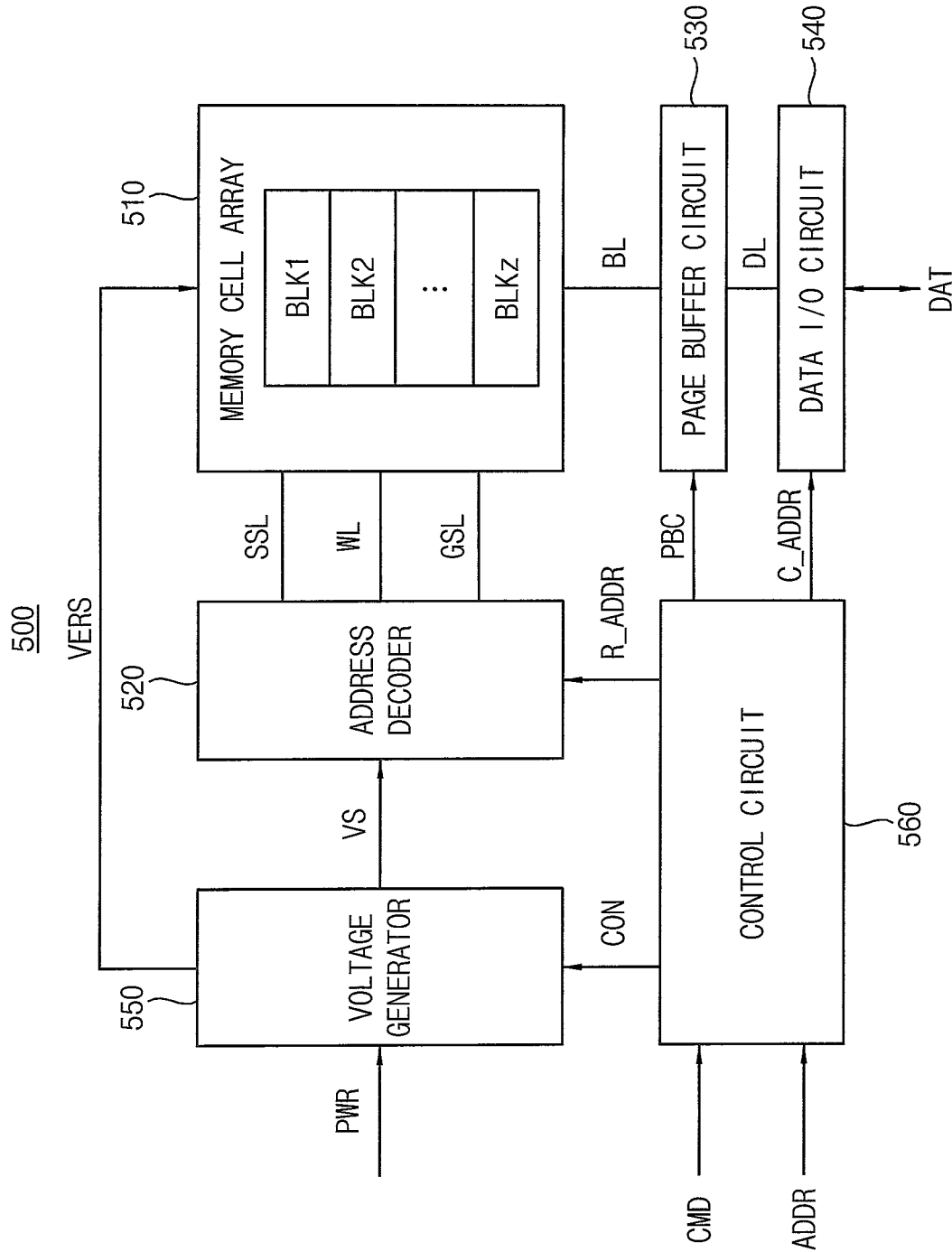
FIG. 5 is a block diagram illustrating a nonvolatile memory included in a storage device according to example embodiments.

FIG. 5 is a block diagram illustrating a nonvolatile memory included in a storage device according to example embodiments.

Referring to FIG. 5, a nonvolatile memory 500 includes a memory cell array 510, an address decoder 520, a page buffer circuit 530, a data I/O circuit 540, a voltage generator 550 and a control circuit 560.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may include a charge trap layer. The following patent documents, which are hereby incorporated by reference in their entireties, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648.

The control circuit 560 receives a command CMD and an address ADDR from an outside (e.g., from the storage controller 310 in FIG. 2), and controls erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine at least one of the plurality of wordlines WL as a selected wordline, and may determine the rest or remainder of the plurality of wordlines WL, other than the selected wordline, as unselected wordlines, based on the row address R_ADDR.

In addition, in the data erase/write/read operations, the address decoder 520 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 520 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 550 may generate voltages VS that are required for an operation of the nonvolatile memory 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from the outside of the nonvolatile memory 500 to the memory cell array 510 via the page buffer circuit 530 or may provide the data DAT from the memory cell array 510 to the outside of the nonvolatile memory 500, based on the column address C_ADDR.

Although the nonvolatile memory according to example embodiments is described based on a NAND flash memory, the nonvolatile memory according to example embodiments may be any nonvolatile memory, e.g., a PRAM, an RRAM, an NFGM, a PoRAM, a MRAM, a FRAM, a TRAM, or the like.

Figure 6:
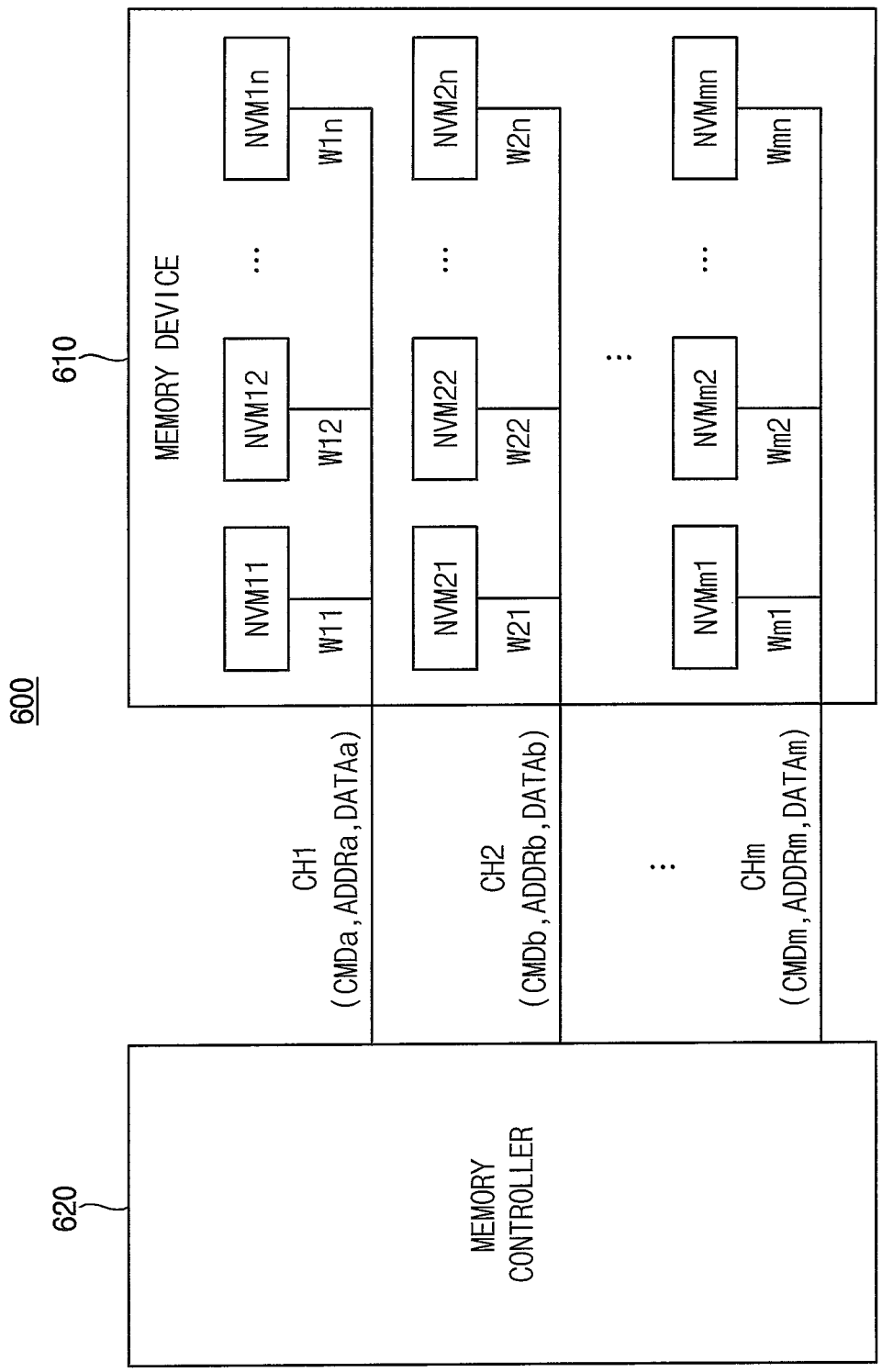
FIG. 6 is a block diagram illustrating a nonvolatile memory and a memory system including the nonvolatile memory according to example embodiments.

FIG. 6 is a block diagram illustrating a nonvolatile memory and a memory system including the nonvolatile memory according to example embodiments.

Referring to FIG. 6, a memory system 600 may include a memory device 610 and a memory controller 620. The memory system 600 may support a plurality of channels CH1, CH2, . . . , CHm, and the memory device 610 may be connected to the memory controller 620 through the plurality of channels CH1 to CHm. For example, the memory system 600 may be implemented as a storage device, such as a universal flash storage (UFS), a solid state drive (SSD), or the like.

The memory device 610 may include a plurality of nonvolatile memories NVM11, NVM12, . . . , NVM1n, NVM21, NVM22, . . . , NVM2n, NVMm1, NVMm2, . . . , NVMmn. For example, the nonvolatile memories NVM11 to NVMmn may correspond to the nonvolatile memories 320a, 320b and 320c in FIG. 2. Each of the nonvolatile memories NVM11 to NVMmn may be connected to one of the plurality of channels CH1 to CHm through a way corresponding thereto. For instance, the nonvolatile memories NVM11 to NVM1n may be connected to the first channel CH1 through ways W11, W12, . . . , W1n, the nonvolatile memories NVM21 to NVM2n may be connected to the second channel CH2 through ways W21, W22, . . . , W2n, and the nonvolatile memories NVMm1 to NVMmn may be connected to the m-th channel CHm through ways Wm1, Wm2, . . . , Wmn. In some example embodiments, each of the nonvolatile memories NVM11 to NVMmn may be implemented as a memory unit that may operate according to an individual command from the memory controller 620. For example, each of the nonvolatile memories NVM11 to NVMmn may be implemented as a chip or a die, but example embodiments are not limited thereto.

The memory controller 620 may transmit and receive signals to and from the memory device 610 through the plurality of channels CH1 to CHm. For example, the memory controller 620 may correspond to the storage controller 310 in FIG. 2. For example, the memory controller 620 may transmit commands CMDa, CMDb, . . . , CMDm, addresses ADDRa, ADDRb, . . . , ADDRm and data DATAa, DATAb, . . . , DATAm to the memory device 610 through the channels CH1 to CHm or may receive the data DATAa to DATAm from the memory device 610.

The memory controller 620 may select one of the nonvolatile memories NVM11 to NVMmn, which is connected to each of the channels CH1 to CHm, by using a corresponding one of the channels CH1 to CHm, and may transmit and receive signals to and from the selected nonvolatile memory. For example, the memory controller 620 may select the nonvolatile memory NVM11 from among the nonvolatile memories NVM11 to NVM1*n* connected to the first channel CH1. The memory controller 620 may transmit the command CMDa, the address ADDRa and the data DATAa to the selected nonvolatile memory NVM11 through the first channel CH1 or may receive the data DATAa from the selected nonvolatile memory NVM11.

The memory controller 620 may transmit and receive signals to and from the memory device 610 in parallel through different channels. For example, the memory controller 620 may transmit the command CMDb to the memory device 610 through the second channel CH2 while transmitting the command CMDa to the memory device 610 through the first channel CH1. For example, the memory controller 620 may receive the data DATAb from the memory device 610 through the second channel CH2 while receiving the data DATAa from the memory device 610 through the first channel CH1.

The memory controller 620 may control overall operations of the memory device 610. The memory controller 620 may transmit a signal to the channels CH1 to CHm and may control each of the nonvolatile memories NVM11 to NVMmn connected to the channels CH1 to CHm. For example, the memory controller 620 may transmit the command CMDa and the address ADDRa to the first channel CH1 and may control one selected from among the nonvolatile memories NVM11 to NVM1*n*.

Each of the nonvolatile memories NVM11 to NVMmn may operate under the control of the memory controller 620. For example, the nonvolatile memory NVM11 may program the data DATAa based on the command CMDa, the address ADDRa and the data DATAa provided from the memory controller 620 through the first channel CH1. For example, the nonvolatile memory NVM21 may read the data DATAb based on the command CMDb and the address ADDRb provided from the memory controller 620 through the second channel CH2 and may transmit the read data DATAb to the memory controller 620 through the second channel CH2.

Although FIG. 6 illustrates an example where the memory device 610 communicates with the memory controller 620 through m channels and includes n nonvolatile memories corresponding to each of the channels, the number of channels and the number of nonvolatile memories connected to one channel may be variously changed according to example embodiments.

Hereinafter, example embodiments will be described in detail based on an example where the storage device is a UFS. However, example embodiments are not limited thereto, and example embodiments may be applied or employed to various storage devices such as SSD.

Figure 7:
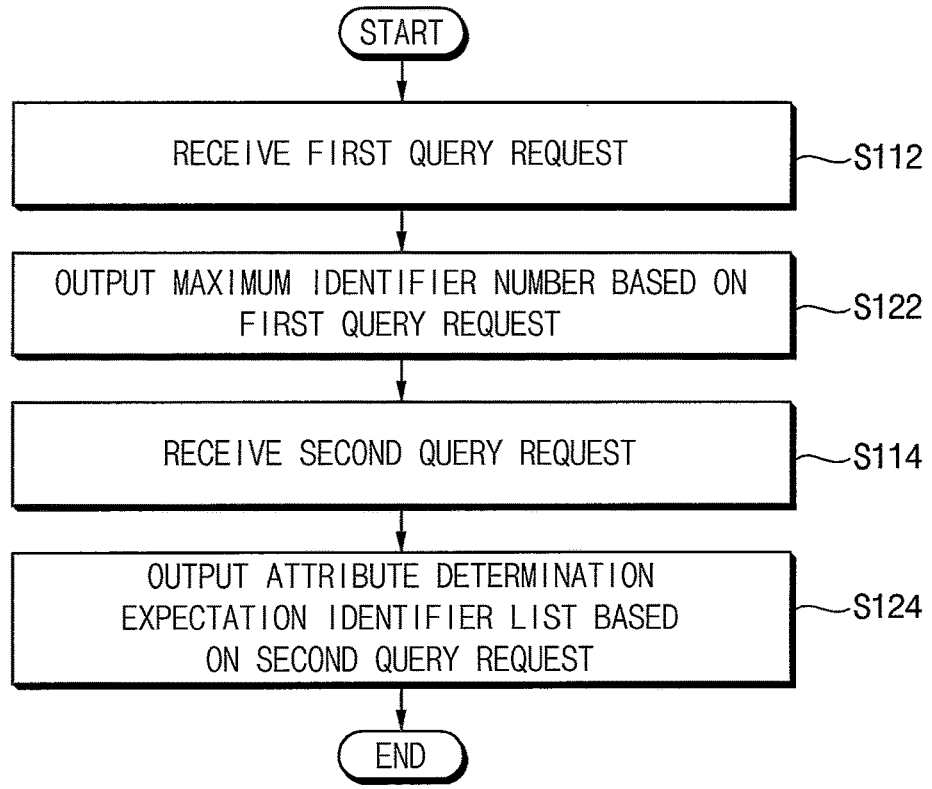
FIG. 7 is a flowchart illustrating an example of receiving an identifier information request and an example of outputting information associated with a plurality of identifiers in FIG. 1.

FIG. 7 is a flowchart illustrating an example of receiving an identifier information request and an example of outputting information associated with a plurality of identifiers in FIG. 1. FIGS. 8, 9, 10A, 10B, 10C and 10D are diagrams for describing operations of FIG. 7.

Referring to FIGS. 1, 2, 7 and 8, when receiving the identifier information request (operation S110), the storage device 300 may receive a first query request QREQ1 from the host device 200 (operation S112). For example, the first query request QREQ1 may be output from the host device 200 to obtain information provided from the storage device 300, may include a query request UFS protocol information unit (UPIU) complying with or conforming to the UFS standard, and may be provided by setting a command for reading a specific descriptor into a specific field of the query request UPIU.

When outputting the information associated with the plurality of identifiers (operation S120), the storage device 300 may output a maximum identifier number NOI based on the first query request QREQ1 (operation S122). The maximum identifier number NOI may represent the quantity (or number) of the plurality of identifiers supported by the storage device 300. For example, the maximum identifier number NOI may be included in a first query response QRSP1 corresponding to the first query request QREQ1, and the storage device 300 may output the first query response QRSP1 including the maximum identifier number NOI. For example, the first query response QRSP1 may include a query response UPIU complying with the UFS standard.

When receiving the identifier information request (operation S110), the storage device 300 may receive a second query request QREQ2 from the host device 200 (operation S114). For example, as with the first query request QREQ1, the second query request QREQ2 may include a query response UPIU, and may be provided by setting a command for reading a specific attribute into a specific field of the query request UPIU.

When outputting the information associated with the plurality of identifiers (operation S120), the storage device 300 may output an attribute determination expectation identifier list LIST1 based on the second query request QREQ2 (operation S124). The attribute determination expectation identifier list LIST1 may include the plurality of identifiers and information indicating whether each of the plurality of identifiers is available. The attribute determination expectation identifier list LIST1 may be substantially the same as the first list 312 in FIG. 2. For example, the attribute determination expectation identifier list LIST1 may be included in a second query response QRSP2 corresponding to the second query request QREQ2, and the storage device 300 may output the second query response QRSP2 including the attribute determination expectation identifier list LIST1. For example, as with the first query response QRSP1, the second query response QRSP2 may include a query response UPIU.

Figure 8:
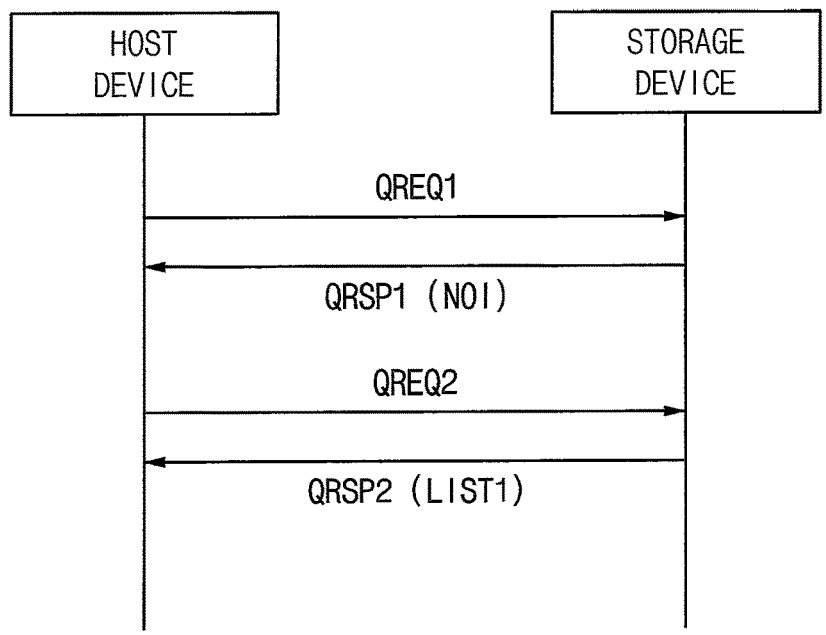

Referring to FIG. 9, an example of the query request UPIU included in the first query request QREQ1 and the second query request QREQ2 in FIG. 8 is illustrated.

As illustrated in FIG. 9, the query request UPIU may include a plurality of fields, and numbers and names for each field may be denoted. For example, the plurality of fields may include "xx010110b", "Flags", "Reserved", "Task Tag", "Query Function", "Total EHS Length (00h)", "Reserved", "Data Segment Length", "Transaction Specific Fields", "Header E2ECRC (omit if HD=0)", "Data[0]", "Data[1]", "Data[2]", "Data[3]", . . . , "Data[Length-4]", "Data[Length-3]", "Data[Length-2]", "Data[Length-1]", "Data E2ECRC (omit if HD=0)", etc.

In some example embodiments, the query request UPIU included in the first query request QREQ1 may be provided by setting a command for reading "Geometry Descriptor" as "Read Descriptor 07h (Geometry)" into a field FR1 (e.g., "Transaction Specific Fields").

In some example embodiments, the query request UPIU included in the second query request QREQ2 may be provided by setting a command for reading "Attribute" as "Read Attribute 2Bh (wIdListBitmap)" into the field FR1.

Referring to FIGS. 10A, 10B, 10C and 10D, the query response UPIU included in the first query response QRSP1 and the second query response QRSP2 in FIG. 8 is illustrated.

As illustrated in FIG. 10A, the query response UPIU may include a plurality of fields, and numbers and names for each field may be denoted. For example, the plurality of fields may include "xx110110b", "Flags", "Reserved", "Task Tag", "Query Function", "Query Response", "Total EHS Length (00h)", "Device Information", "Data Segment Length", "Transaction Specific Fields", "Header E2ECRC (omit if HD=0)", "Data[0]", "Data[1]", "Data[2]", "Data[3]", . . . , "Data[Length-4]", "Data[Length-3]", "Data[Length-2]", "Data[Length-1]", "Data E2ECRC (omit if HD=0)", etc.

Figures 10B, 10C, 10D:
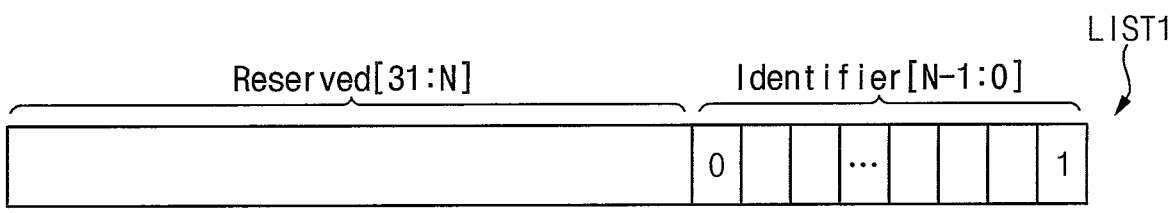

In some example embodiments, the query response UPIU included in the first query response QRSP1 may be provided by setting "Read Descriptor 07h (Geometry)", which represents the read of "Geometry Descriptor", into a field FR21 (e.g., "Transaction Specific Fields"), and by including the read "Geometry Descriptor" in a field FR22 (e.g., "Data Field"). In other words, the field FR21 in the query response UPIU of the first query response QRSP1 may be set similarly to the field FR1 in the query request UPIU of the first query request QREQ1. For example, "Geometry Descriptor" may be implemented as illustrated in FIG. 10B, and may include the maximum identifier number NOI. For example, the maximum identifier number NOI included in "Geometry Descriptor" may be N, where N is a natural number greater than or equal to two.

In some example embodiments, the query response UPIU included in the second query response QRSP2 may be provided by setting "Read Attribute 2Bh (wIdListBitmap)", which represents the read of "Attribute", into the field FR21 (e.g., "Transaction Specific Fields"), and by including the read "Attribute" in a field FR23 (e.g., another "Transaction Specific Fields"). For example, "Attribute" may be implemented as illustrated in FIG. 10C, and may include the attribute determination expectation identifier list LIST1.

In some example embodiments, as illustrated in FIG. 10D, the attribute determination expectation identifier list LIST1 may be provided in the form of a bitmap. For example, the attribute determination expectation identifier list LIST1 may include reserved bits Reserved[31:N] and identifier bits Identifier[N−1:0]. For example, the plurality of identifiers may be denoted as numbers. For example, when the maximum identifier number NOI is N, the plurality of identifiers may be denoted as N numbers from 0 to N−1.

In some example embodiments, a position of each of the identifier bits Identifier[N−1:0] may represent a respective one of the plurality of identifiers. For example, in the identifier bits Identifier[N−1:0], a least significant bit (LSB) may represent an identifier corresponding to a number 0, and a most significant bit (MSB) may represent an identifier corresponding to a number N−1.

In some example embodiments, a bit value of each of the identifier bits Identifier[N−1:0] may represent information indicating whether each of the identifier bits is available. For example, as illustrated in FIG. 10D, when a bit value of the LSB among the identifier bits Identifier[N−1:0] is 1, it may represent that the identifier corresponding to the number 0 is available. When a bit value of the MSB among the identifier bits Identifier[N−1:0] is 0, it may represent that the identifier corresponding to the number N−1 is unavailable.

Figure 11:
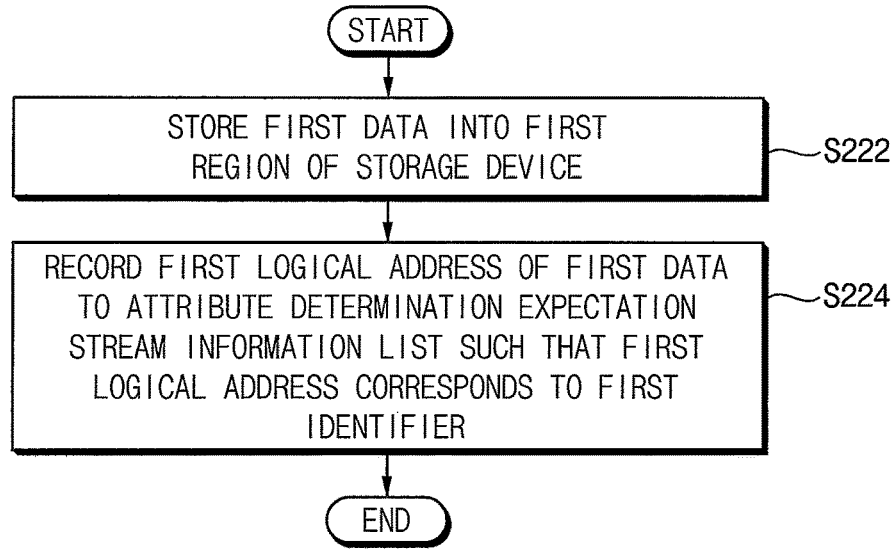
FIG. 11 is a flowchart illustrating an example of performing a data write operation on first data in FIG. 1.
Figure 12:
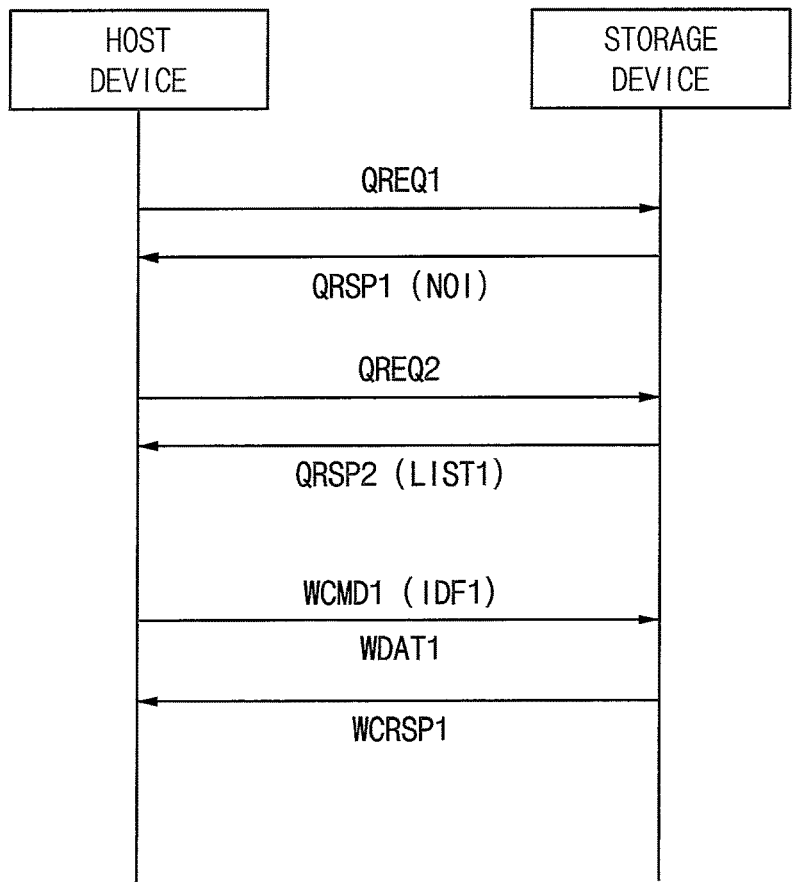
Figure 14:
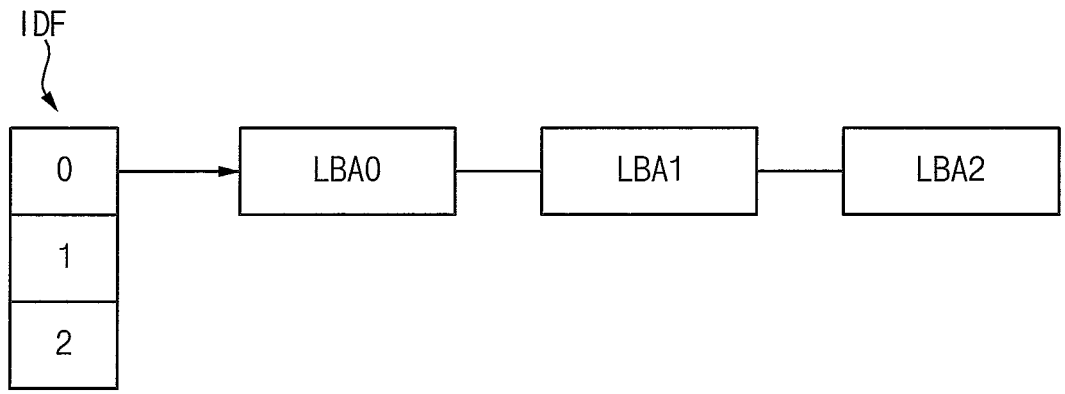

FIG. 11 is a flowchart illustrating an example of performing a data write operation on first data in FIG. 1. FIGS. 12, 13 and 14 are diagrams for describing operations of FIG. 11.

Referring to FIGS. 1, 2, 11 and 12, before the data write operation, operations S112, S122, S114 and S124 may be performed as described with reference to FIGS. 1, 2, 7 and 8.

The storage device 300 may then receive a first write command WCMD1 including a first identifier IDF1 and first data WDAT1 from the host device 200 (operation S210). For example, the first write command WCMD1 may include a write command UPIU complying with the UFS standard.

When receiving the first write command WCMD1 and the first data WDAT1, the storage device 300 may receive the first write command WCMD1 from the host device 200 first, and then the storage device 300 may output a ready-to-transfer (RTT) response to the host device 200 based on the reception of the first write command WCMD1, and thereafter the storage device 300 may receive the first data WDAT1 from the host device 200.

When performing the data write operation on the first data (operation S220), the storage device 300 may store the first data WDAT1 into a first region (or area) of the storage device 300 (operation S222). For example, the first region may be a region corresponding to a first logical address included in the first write command WCMD1. For example, the first logical address may include a logical block address (LBA).

In addition, when performing the data write operation on the first data (operation S220), the storage device 300 may record a first logical address of the first data WDAT1 to an attribute determination expectation stream information list such that the first logical address corresponds to the first identifier IDF1 (operation S224). The attribute determination expectation stream information list may include a relationship between the plurality of identifiers and a plurality of logical addresses to which the plurality of identifiers are assigned. In other words, the attribute determination expectation stream information list may be updated. For example, the attribute determination expectation stream information list may be substantially the same as the second sub-list ESL included in the second list 314 of FIG. 2.

Although FIG. 11 illustrates that operation S222 is performed first and then operation S224 is performed later, example embodiments are not limited thereto. For example, operation S224 may be performed first and then operation S222 may be performed later, or operations S222 and S224 may be substantially simultaneously or concurrently performed.

The storage device 300 may then output a first write response WCRSP1 that represents a completion of processing the first write command WCMD1, e.g., a completion of the data write operation for the first data WDAT1 to the host device 200.

Referring to FIG. 13, an example of the write command UPIU included in the first write command WCMD1 in FIG. 12 is illustrated.

As illustrated in FIG. 13, the write command UPIU may include a plurality of fields. For example, the plurality of fields may include "OPERATION CODE (2Ah)", "WRPROTECT", "DPO" (e.g., disable page out), "FUA" (e.g., force unit access), "Reserved", "FUA_NV", "Obsolete", "LOGICAL BLOCK ADDRESS", "Identifier", "GROUP NUMBER", "TRANSFER LENGTH", "CONTROL=00h", etc.

In some example embodiments, the first identifier IDF1 may be included in a field FR31 (e.g., "Identifier") of the first write command WCMD1. In other words, the write command UPIU included in the first write command WCMD1 may be provided by including the first identifier IDF1 in the field (or an identifier field) FR31. For example, the field FR31 may be a reserved field (e.g., an empty field) in an existing write command UPIU, and the reserved field may be set as or changed to the identifier field such that the method of writing data according to example embodiments is performed using or based on the identifier field.

As described above, the host device 200 may select one of the plurality of identifiers that are supported by the storage device 300, may set the selected identifier into a field of the write command associated with the write data of which the attribute is scheduled to be assigned later, and may transmit the write command with the selected identifier to the storage device 300.

Referring to FIG. 14, an example of the attribute determination expectation stream information list, e.g., the second sub-list ESL included in the second list 314 of FIG. 2 is illustrated.

As illustrated in FIG. 14, a plurality of identifiers IDF may include an identifier corresponding to a number 0, an identifier corresponding to a number 1, and an identifier corresponding to a number 2. For example, when the first write command WCMD1 includes the identifier corresponding to the number 0 and logical addresses LBA0, LBA1 and LBA2, the logical addresses LBA0, LBA1 and LBA2 may be recorded in the attribute determination expectation stream information list such that the logical addresses LBA0, LBA1 and LBA2 correspond to the number 0 in operation S224.

Figure 15:
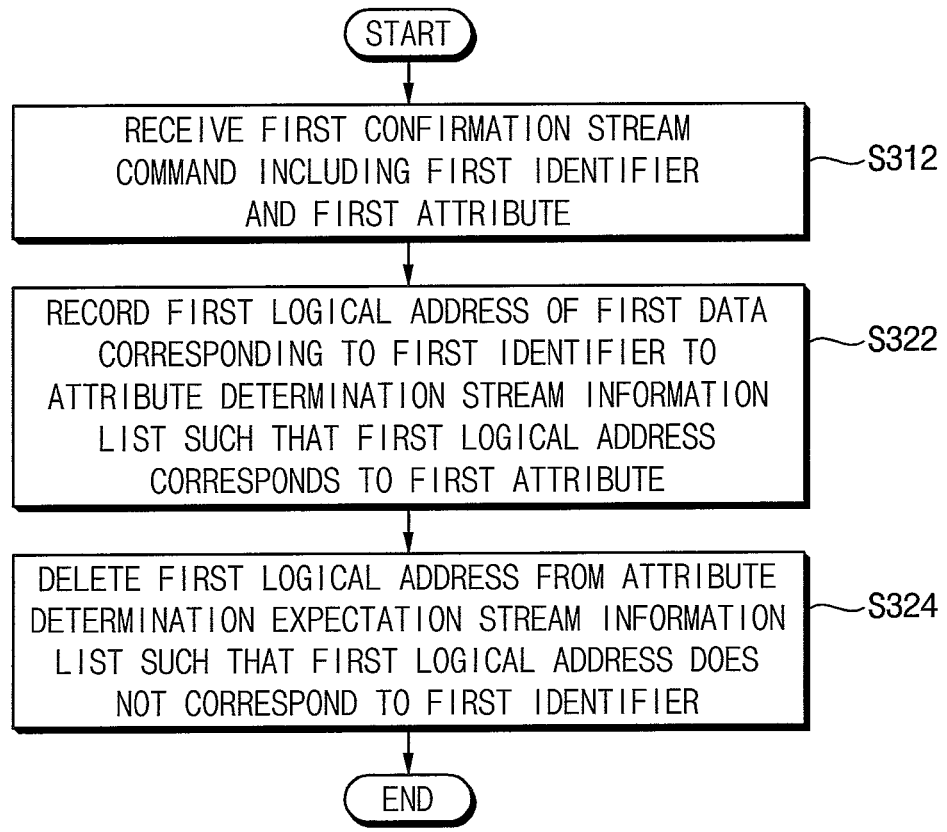
FIG. 15 is a flowchart illustrating an example of receiving a first attribute assignment command and an example of assigning a first attribute to first data in FIG. 1.

FIG. 15 is a flowchart illustrating an example of an attribute assignment operation, which includes receiving a first attribute assignment command and an example of assigning a first attribute to first data in FIG. 1. FIGS. 16, 17, 18 and 19 are diagrams for describing operations of FIG. 15.

Referring to FIGS. 1, 2, 15 and 16, before the attribute assignment operation, operations S112, S122, S114 and S124 may be performed as described with reference to FIGS. 1, 2, 7 and 8, and operations S210, S222 and S224 may be performed as described with reference to FIGS. 1, 2, 11 and 12.

The storage device 300 may receive the first attribute assignment command for the attribute assignment operation (operation S310).

For example, when receiving the first attribute assignment command (operation S310), the storage device 300 may receive a first confirmation stream command CSCMD1 including the first identifier IDF1 and a first attribute SID1 (operation S312). The first confirmation stream command CSCMD1 may be defined to have a field configuration different from that of the first write command WCMD1, and may be newly defined such that the method of writing data according to example embodiments is performed using or based on the first confirmation stream command CSCMD1. For example, the first confirmation stream command CSCMD1 may include a confirmation stream command UPIU complying with the UFS standard.

When assigning the first attribute to the first data (operation S320), the storage device 300 may record the first logical address of the first data WDAT1 corresponding to the first identifier IDF1 to an attribute determination stream information list such that the first logical address corresponds to the first attribute SID1 (operation S322). The attribute determination stream information list may include a relationship between the plurality of attributes and a plurality of logical addresses to which the plurality of attributes are assigned. For example, the attribute determination stream information list may be substantially the same as the first sub-list CSL included in the second list 314 of FIG. 2.

When assigning the first attribute to the first data (operation S320), the storage device 300 may delete the first logical address from the attribute determination expectation stream information list such that the first logical address does not correspond to the first identifier IDF1 (operation S324, e.g., the first logical address recorded to correspond to the first identifier IDF1 may be deleted).

In other words, based on the first confirmation stream command CSCMD1, the first data WDAT1 and the first logical address may be changed, switched and/or converted from a state in which the attribute is scheduled to be determined to a state in which the attribute is determined, and the attribute determination stream information list and the attribute determination expectation stream information list may be updated to reflect the state change.

The storage device 300 may output a first response CSCRSP1 that represents a completion of processing the first confirmation stream command CSCMD1, e.g., a completion of the operation of setting the attribute of the first data WDAT1 and the first logical address to the host device 200.

Figure 16:
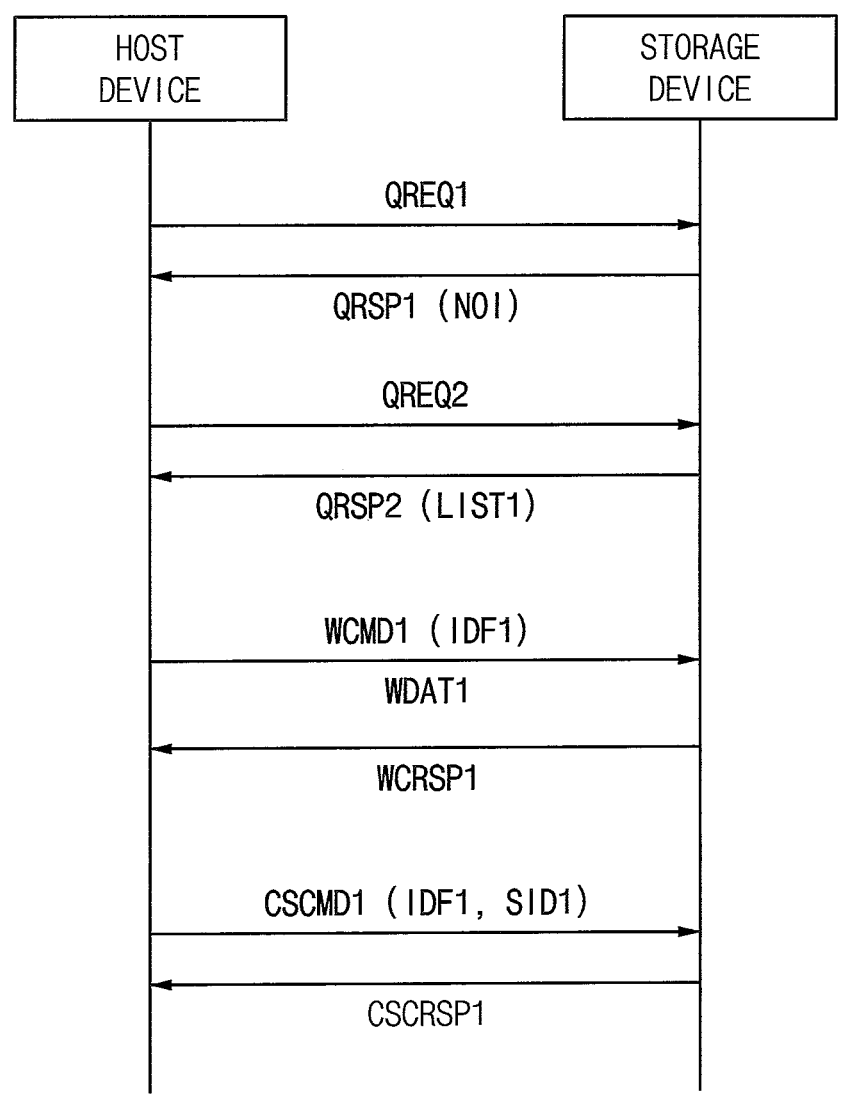
FIGS. 16, 17, 18 and 19 are diagrams for describing operations of FIG. 15.
Figure 17:
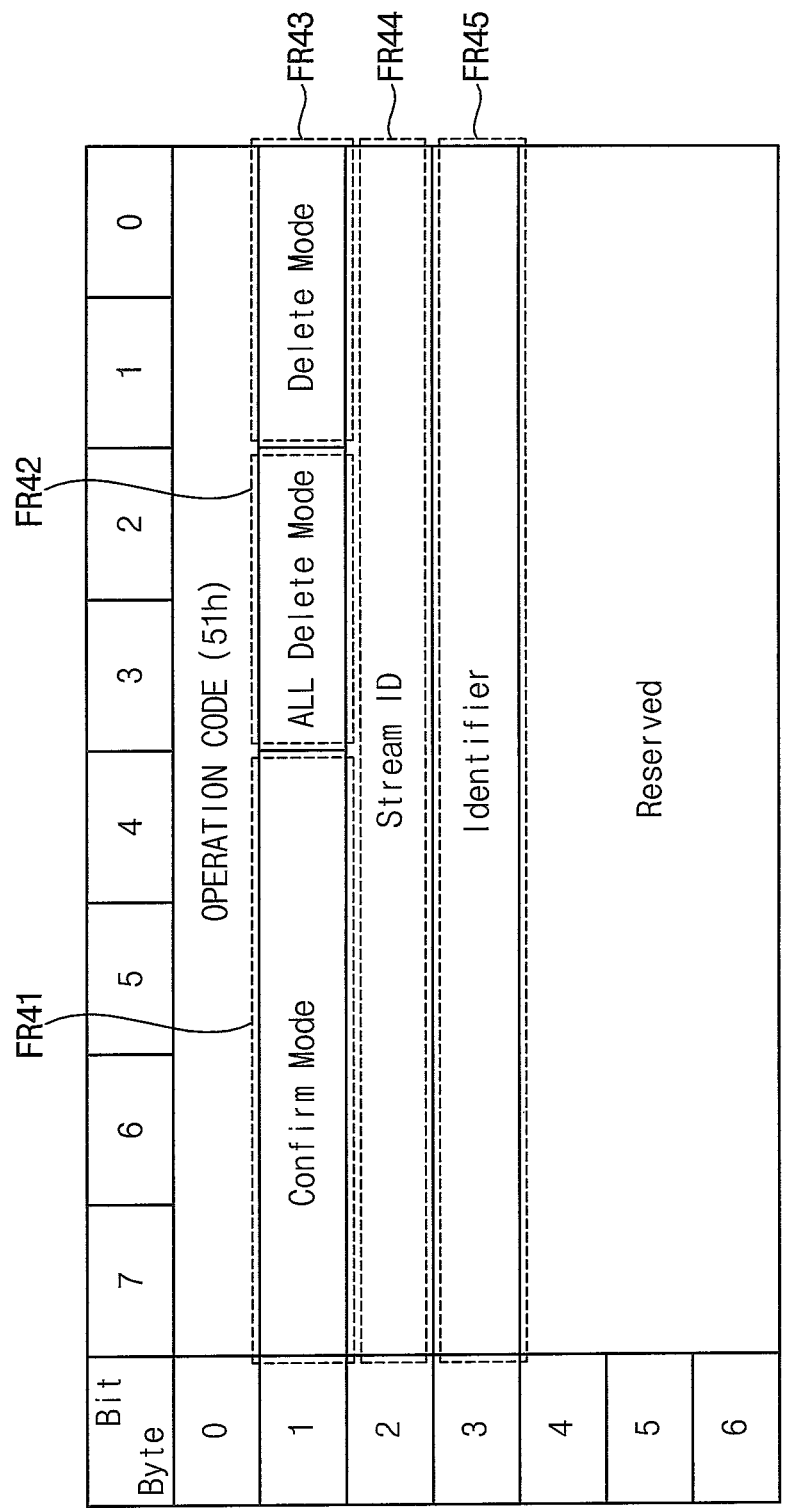

Referring to FIG. 17, an example of the confirmation stream command UPIU included in the first confirmation stream command CSCMD1 in FIG. 16 is illustrated.

As illustrated in FIG. 17, the confirmation stream command UPIU may include a plurality of fields. For example, the plurality of fields may include "OPERATION CODE (51h)", "Confirm Mode", "ALL Delete Mode", "Delete Mode", "Stream ID", "Identifier", "Reserved", etc.

A field (or a confirmation mode field) FR41 (e.g., "Confirm Mode") may be used to set an operation mode in which the attribute assignment operation is performed. A field (or a stream ID field) FR44 (e.g., "Stream ID") may include a stream ID that represents or corresponds to the attribute of data. A field (or an identifier field) FR45 (e.g., "Identifier") may include the identifier.

In some example embodiments, to perform operations S310 and S320, the field FR41 in the first confirmation stream command CSCMD1 may be set to be enabled or activated, and the first identifier IDF1 and the first attribute SID1 may be included in the field FR45 and the field FR44 in the first confirmation stream command CSCMD1, respectively.

As described above, after transmitting the write command, the host device 200 may transmit the confirmation stream command by setting the identifier included in the previously transmitted write command, the attribute to be assigned and the confirmation mode field.

A field (or an all deletion mode field) FR42 (e.g., "ALL Delete Mode") and a field (or a deletion mode field) FR43 (e.g., "Delete Mode") may be used to set an operation mode in which an operation of deleting at least a part of an attribute determination expectation stream information list is performed. The fields FR42 and FR43 will be described with reference to FIGS. 27, 28, 29 and 30.

Figure 18:
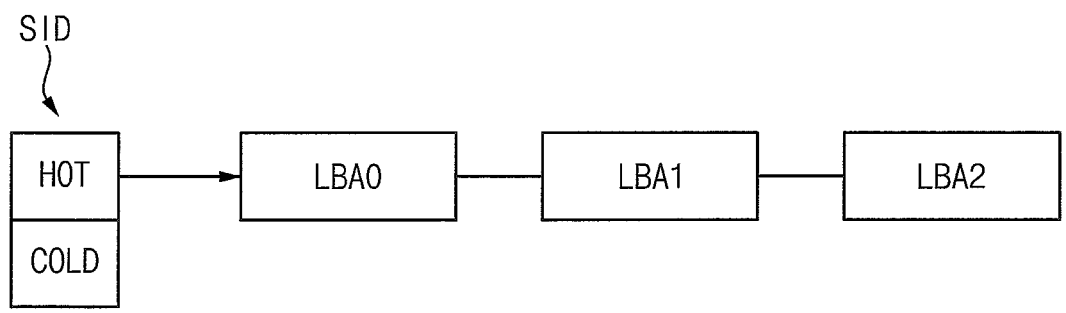
Figure 19:
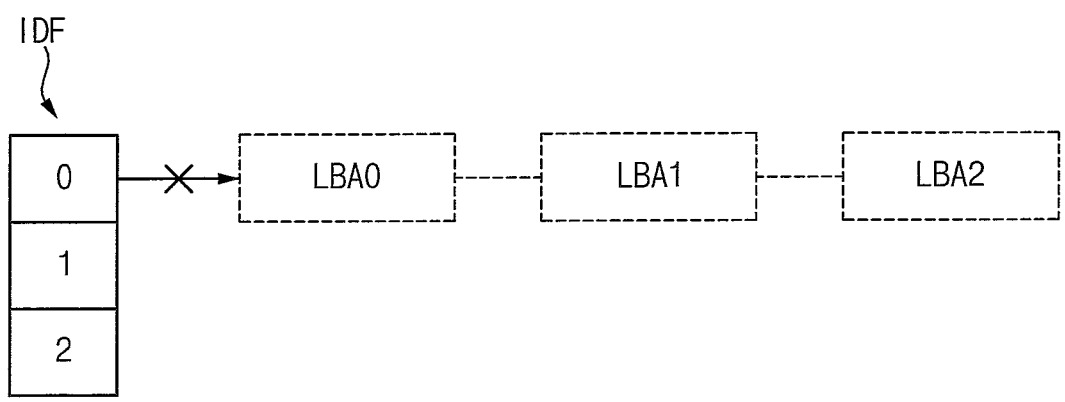

Referring to FIG. 18, an example of the attribute determination stream information list, e.g., the first sub-list CSL included in the second list 314 of FIG. 2 is illustrated. Referring to FIG. 19, an example of the attribute determination expectation stream information list, e.g., the second sub-list ESL included in the second list 314 of FIG. 2 is illustrated.

As illustrated in FIG. 18, the plurality of attributes, e.g., a plurality of stream IDs SID may include a stream ID corresponding to "hot" attribute and a stream ID corresponding to "cold" attribute. As illustrated in FIG. 19, the plurality of identifiers IDF may include the identifier corresponding to the number 0, the identifier corresponding to the number 1, and the identifier corresponding to the number 2.

When the first confirmation stream command CSCMD1 that is set to enable the confirmation mode field includes the identifier corresponding to the number 0 and the stream ID corresponding to the "hot" attribute is provided, the logical addresses LBA0, LBA1 and LBA2 that correspond to the number 0 and are included in the attribute determination expectation stream information list may be recorded to the attribute determination stream information list such that the logical addresses LBA0, LBA1 and LBA2 correspond to the "hot" attribute in operation S322, and the logical addresses LBA0, LBA1 and LBA2 that correspond to the number 0 may be deleted from the attribute determination expectation stream information list in operation S324.

As described above, when the storage device 300 receives the confirmation stream command, the storage device 300 may assign the attribute to the data based on the identifier among the write commands and logical addresses that are received before receiving the confirmation stream command.

Figure 20:
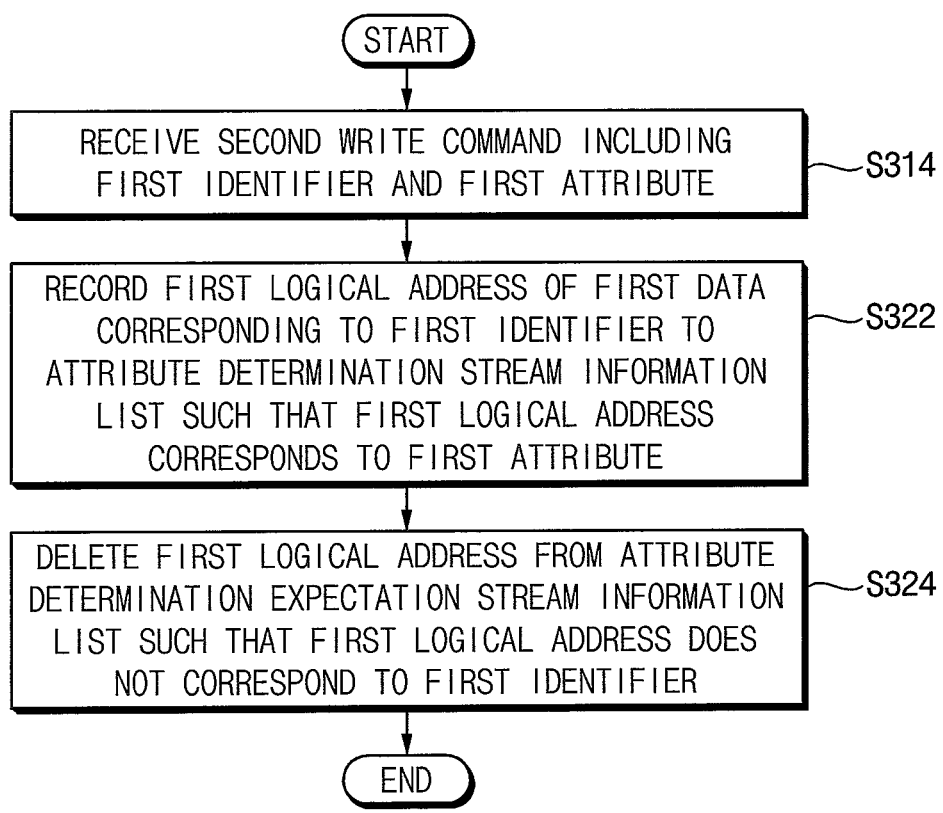
FIG. 20 is a flowchart illustrating another example of receiving a first attribute assignment command and another example of assigning a first attribute to first data in FIG. 1.
Figure 21:
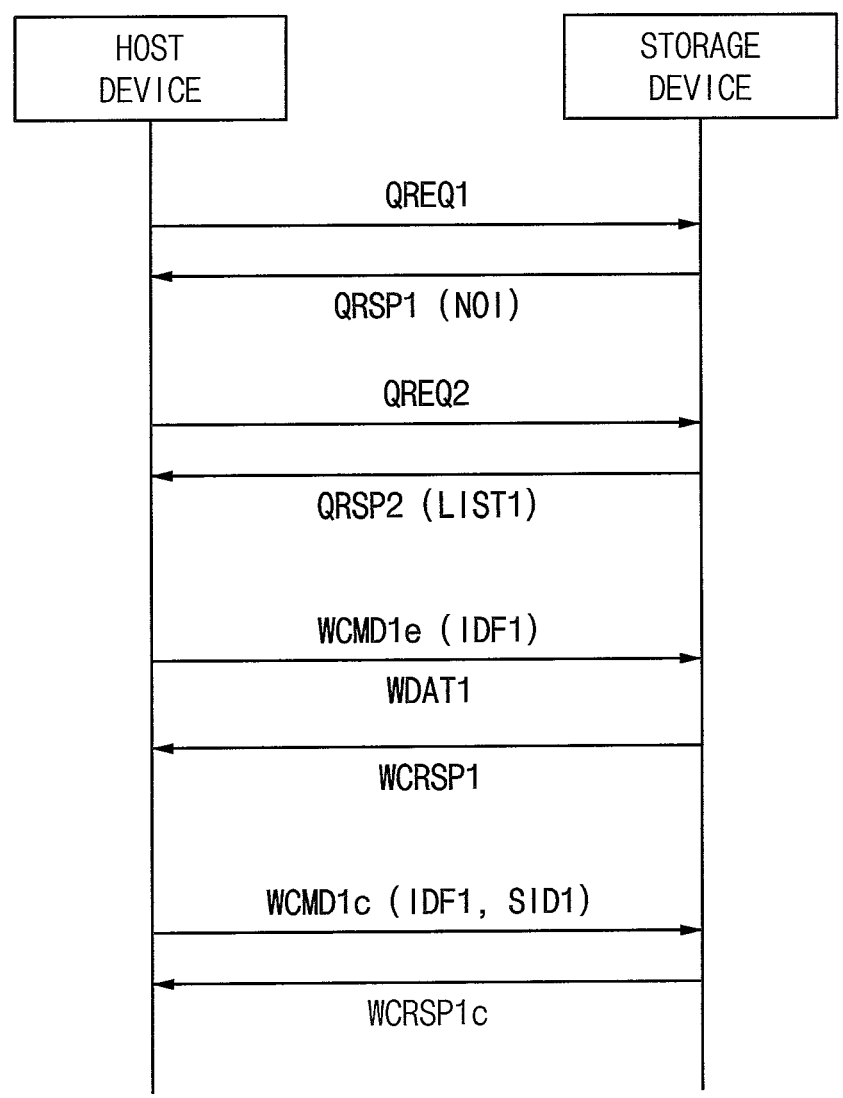
FIGS. 21 and 22 are diagrams for describing operations of FIG. 20.
Figure 22:
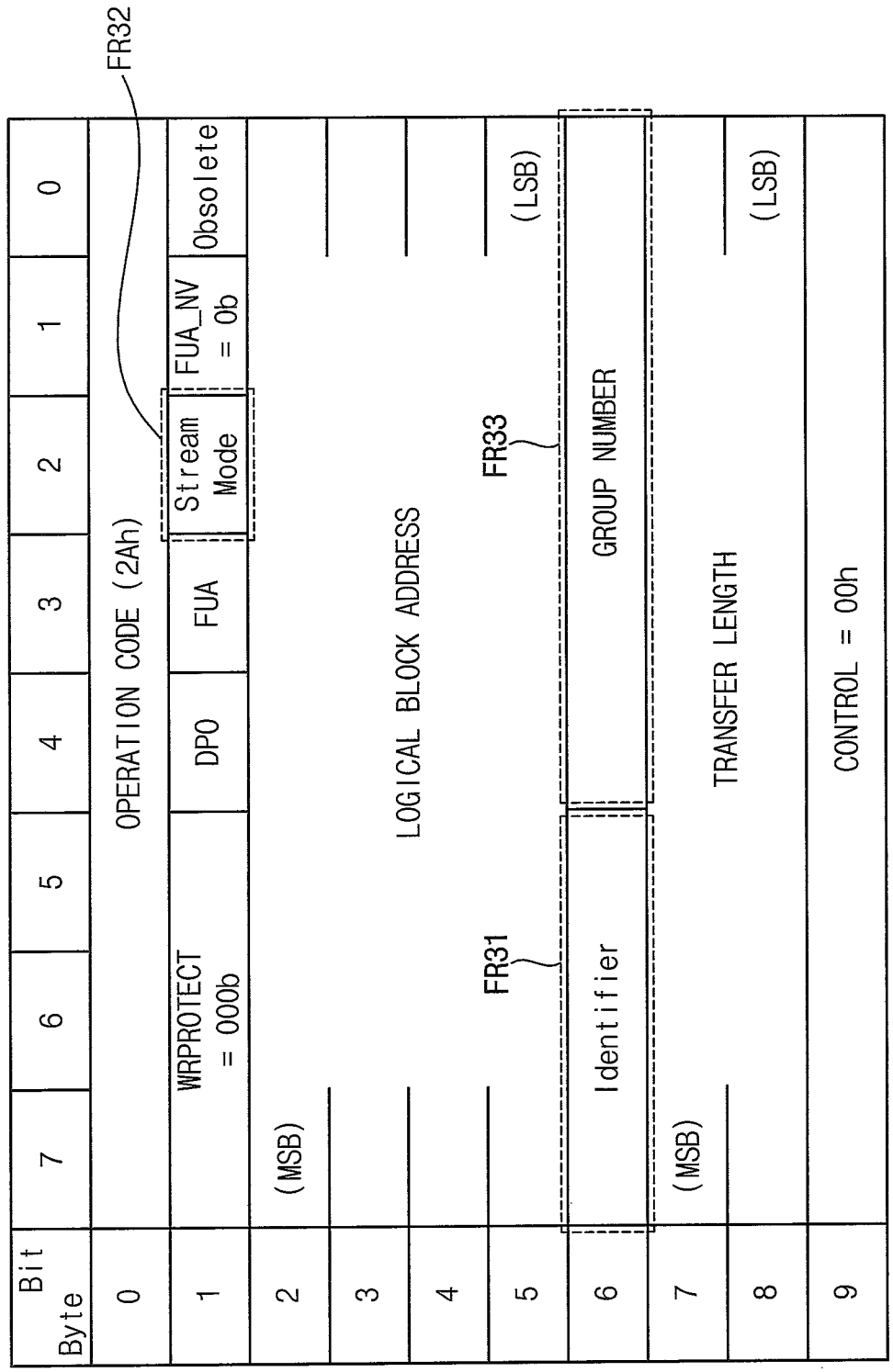

FIG. 20 is a flowchart illustrating another example of an attribute assignment operation, which includes receiving a first attribute assignment command and assigning a first attribute to first data in FIG. 1. FIGS. 21 and 22 are diagrams for describing operations of FIG. 20. The descriptions repeated with FIGS. 15, 16, 17, 18 and 19 will be omitted.

Referring to FIGS. 1, 2, 20 and 21, before the attribute assignment operation, operations S112, S122, S114 and S124 may be performed as described with reference to FIGS. 1, 2, 7 and 8, and operations S210, S222 and S224 may be performed as described with reference to FIGS. 1, 2, 11 and 12. In this example, a first write command WCMD1e received from the host device 200 may be partially different from the first write command WCMD1 in FIGS. 12 and 16, which will be described with reference to FIG. 22.

The storage device 300 may receive the first attribute assignment command for the attribute assignment operation (operation S310).

For example, when receiving the first attribute assignment command (operation S310), the storage device 300 may receive a second write command WCMD1c including the first identifier IDF1 and the first attribute SID1 (operation S314). The second write command WCMD1c may be defined to have a field configuration the same as that of the first write command WCMD1e. For example, as with the first write command WCMD1e, the second write command WCMD1c may include a write command UPIU complying with the UFS standard.

When assigning the first attribute to the first data (operation S320), operations S322 and S324 may be substantially the same as operations S322 and S324 in FIG. 15, respectively, and may be performed as described with reference to FIGS. 18 and 19.

The storage device 300 may output a second response WCRSP1c that represents a completion of processing the second write command WCMD1c, e.g., a completion of the operation of setting the attribute of the first data WDAT1 and the first logical address.

Referring to FIG. 22, an example of the write command UPIU included in the first write command WCMD1e and the second write command WCMD1c in FIG. 21 is illustrated.

The write command UPIU of FIG. 22 may be substantially the same as the write command UPIU of FIG. 13, except that a reserved field (e.g., "Reserved") corresponding to Byte=1 and Bit=2 is changed to a stream mode field and a group number field (e.g., "GROUP NUMBER") is additionally used.

A field (or the stream mode field) FR32 (e.g., "Stream Mode") may be used to set an operation mode. For example, when the field FR32 is set to 0, it may represent an operation mode for writing data whose attribute is not determined. When the field FR32 is set to 1, it may represent an operation mode for assigning an attribute to data stored with a state where the attribute is not determined.

A field (or an identifier field) FR31 (e.g., "Identifier") may include the identifier. For example, when the field FR32 is set to 0, the identifier included in the field FR31 may represent an identifier corresponding to data whose attribute is not determined. When the field FR32 is set to 1, the identifier included in the field FR31 may represent an identifier used for assigning the attribute to the data stored with the state where the attribute is not determined.

A field (or the group number field) FR33 (e.g., "GROUP NUMBER") may selectively include a stream ID that represents the attribute of data. For example, when the field FR32 is set to 0, the field FR33 may not include the stream ID. When the field FR32 is set to 1, the field FR33 may include a stream ID used for assigning the attribute to the data stored with the state where the attribute is not determined.

In some example embodiments, to perform operations S210 and S220, the field FR32 in the first write command WCMD1e may be set to 0, and the first identifier IDF1 may be included in the field FR31 in the first write command WCMD1e.

In some example embodiments, to perform operations S310 and S320, the field FR32 in the second write command WCMD1e may be set to 1, and the first identifier IDF1 and the first attribute SID1 may be included in the field FR31 and the field FR33 in the second write command WCMD1e, respectively.

As described above, the host device 200 may select one of the identifiers supported by the storage device 300, may set the first write command such that the selected identifier is included in a specific field of the first write command that is to be assigned the attribute later, may set the stream mode field of the first write command to 0, and may transmit the first write command. The host device 200 may set the second write command such that the identifier included in the first write command that is previously transmitted and the attribute that is to be assigned are included in specific fields of the second write command, may set the stream mode field of the second write command to 1, and may transmit the second write command. When the second write command in which the stream mode field is set to 1 is received, the storage device 300 may assign the attribute to the data based on the identifier among the write commands and logical addresses that includes the stream mode field set to 0 and are received before receiving the second write command.

Figure 23:
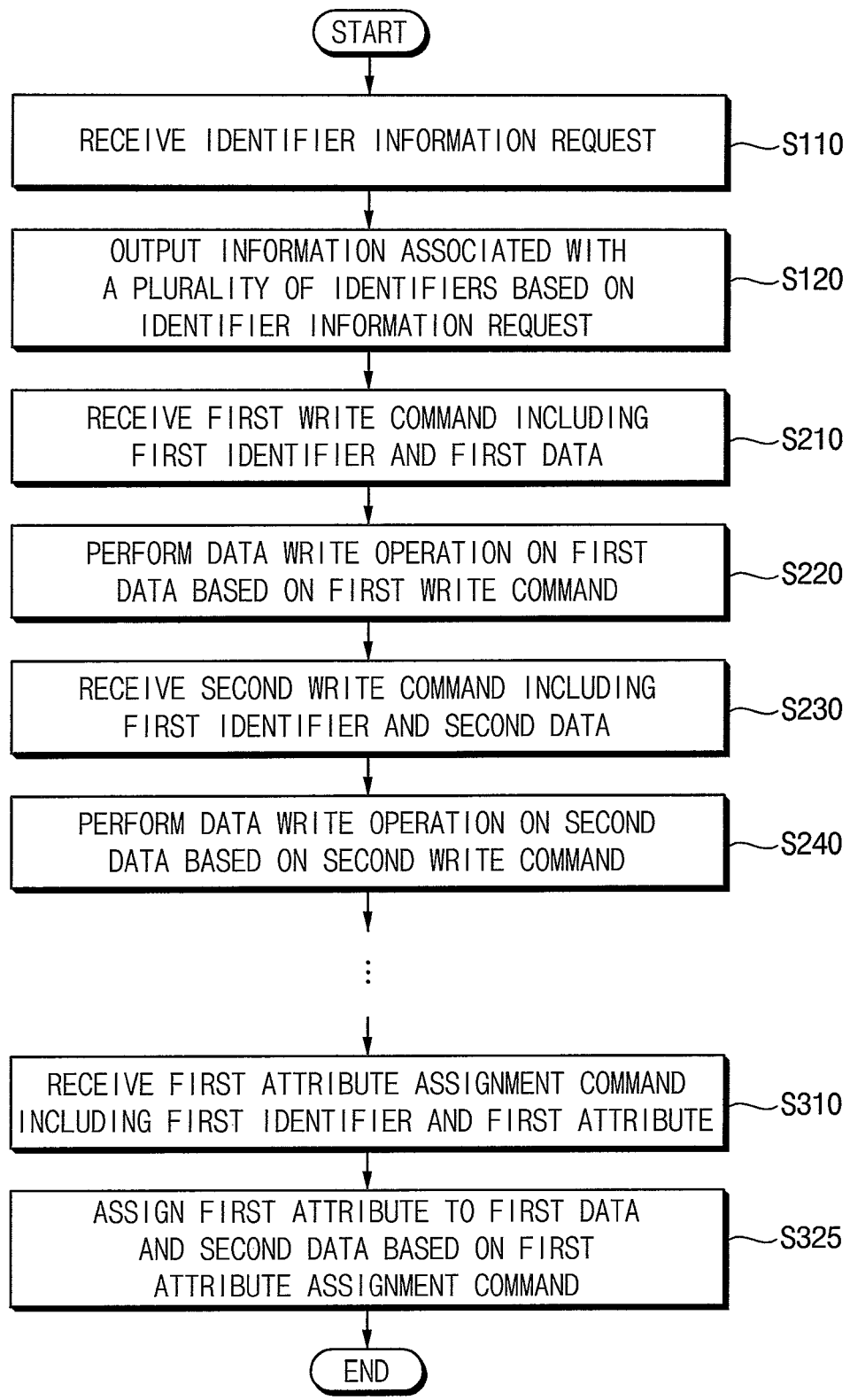
FIG. 23 is a flowchart illustrating a method of writing data in a storage device according to example embodiments.

FIG. 23 is a flowchart illustrating a method of writing data in a storage device according to example embodiments. The descriptions repeated with FIG. 1 will be omitted.

Referring to FIG. 23, in a method of writing data in a storage device according to example embodiments, operations S110, S120, S210 and S220 may be substantially the same as operations S110, S120, S210 and S220 in FIG. 1, respectively.

The storage device receives a second write command and second data from the host device (operation S230). The second write command includes the first identifier. The storage device performs a data write operation on the second data (or writes the second data) corresponding to the first identifier based on the second write command (operation S240). Operations S230 and S240 may be similar to operations S210 and S220, respectively.

Operation S310 may be substantially the same as operation S310 in FIG. 1. The storage device simultaneously assigns or allocates the first attribute to the first data and the second data that are already stored or written in the storage device based on the first attribute assignment command (operation S325). The attribute assignment operation may be performed on a plurality of write commands and a plurality of data at one time.

Figure 24:
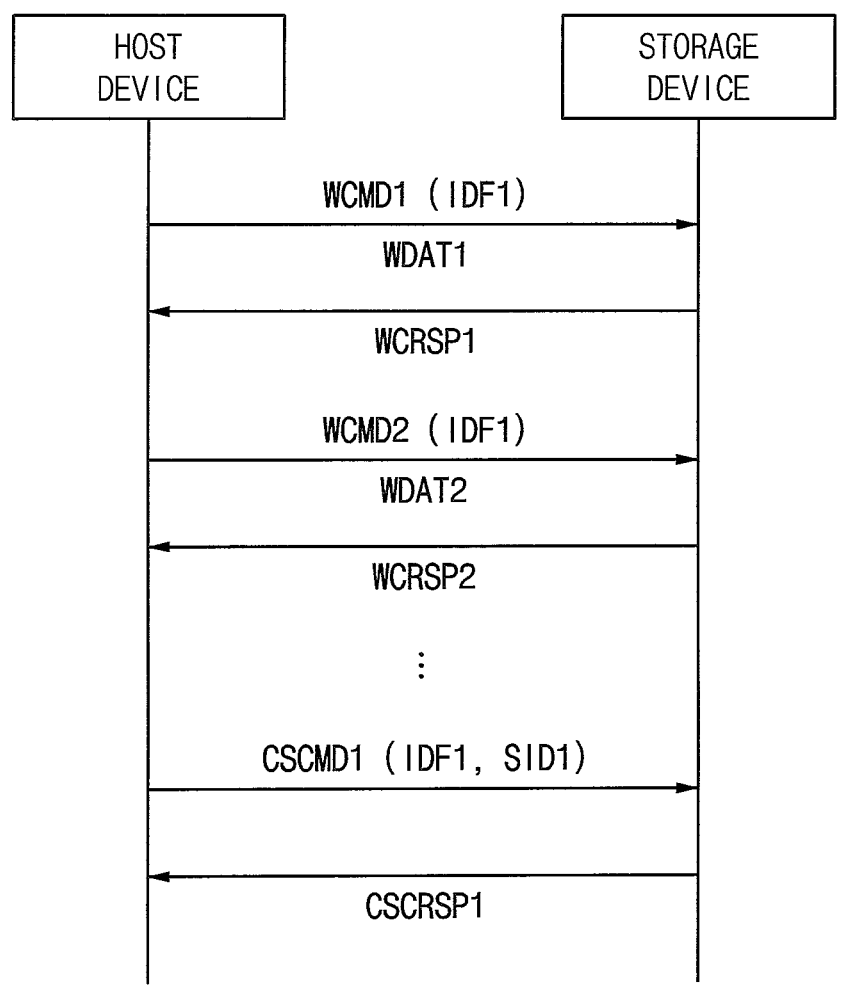
FIG. 24 is a diagram for describing operations of FIG. 23.

FIG. 24 is a diagram for describing operations of FIG. 23. The descriptions repeated with FIGS. 12 and 16 will be omitted.

Referring to FIGS. 2, 23 and 24, an example where the first attribute assignment command is the first confirmation stream command CSCMD1 is illustrated. For convenience of illustration, the operation of receiving the identifier information request and the operation of outputting the information associated with the plurality of identifiers are omitted.

The storage device 300 may receive the first write command WCMD1 including the first identifier IDF1 and the first data WDAT1 from the host device 200, may process the first write command WCMD1, and may output the first write response WCRSP1 that represents the completion of processing the first write command WCMD1 to the host device 200. The storage device 300 may receive a second write command WCMD2 including the first identifier IDF1 and second data WDAT2 from the host device 200, may process the second write command WCMD2, and may output a second write response WCRSP2 that represents a completion of processing the second write command WCMD2 to the host device 200. The storage device 300 may receive the first confirmation stream command CSCMD1 including the first identifier IDF1 and the first attribute SID1 from the host device 200, may process the first confirmation stream command CSCMD1, and may output the first response CSCRSP1 that represents the completion of processing the first confirmation stream command CSCMD1 to the host device 200.

Figure 25:
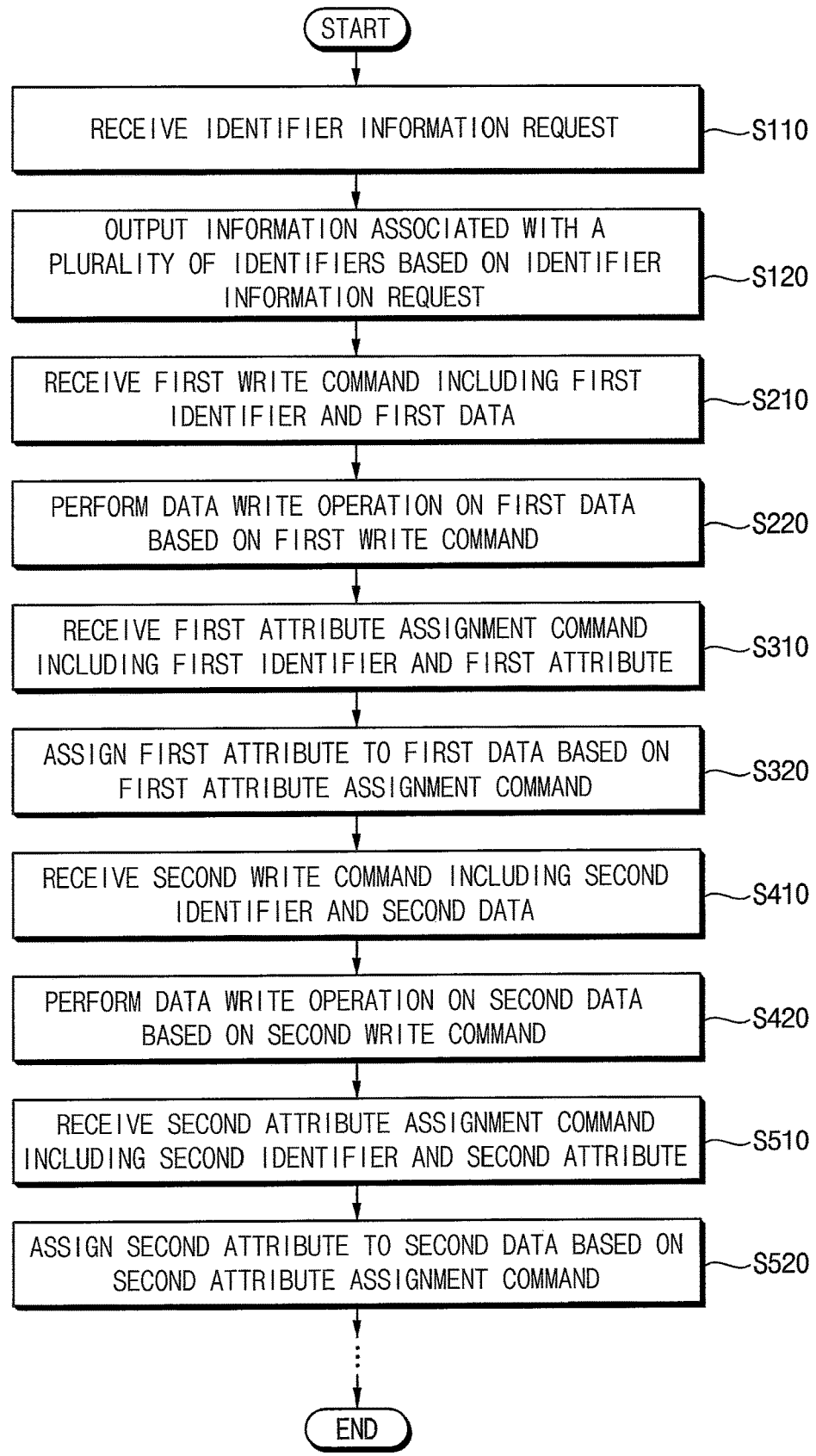
FIG. 25 is a flowchart illustrating a method of writing data in a storage device according to example embodiments.

FIG. 25 is a flowchart illustrating a method of writing data in a storage device according to example embodiments. The descriptions repeated with FIG. 1 will be omitted.

Referring to FIG. 25, in a method of writing data in a storage device according to example embodiments, operations S110, S120, S210, S220, S310 and S320 may be substantially the same as operations S110, S120, S210, S220, S310 and S320 in FIG. 1, respectively.

The storage device receives a second write command and second data from the host device (operation S410). The second write command includes a second identifier among the plurality of identifiers, and the second identifier is different from the first identifier. The storage device performs a data write operation on the second data (or writes the second data) corresponding to the second identifier based on the second write command (operation S420). Operations S410 and S420 may be similar to operations S210 and S220, respectively.

The storage device receives a second attribute assignment command from the host device (operation S510). The second attribute assignment command includes the second identifier and a second attribute among the plurality of attributes, and the second attribute is different from the first attribute. The storage device assigns or allocates the second attribute to the second data that is already stored in the storage device based on the second attribute assignment command (operation S520). Operations S510 and S520 may be similar to operations S310 and S320, respectively.

Figure 26:
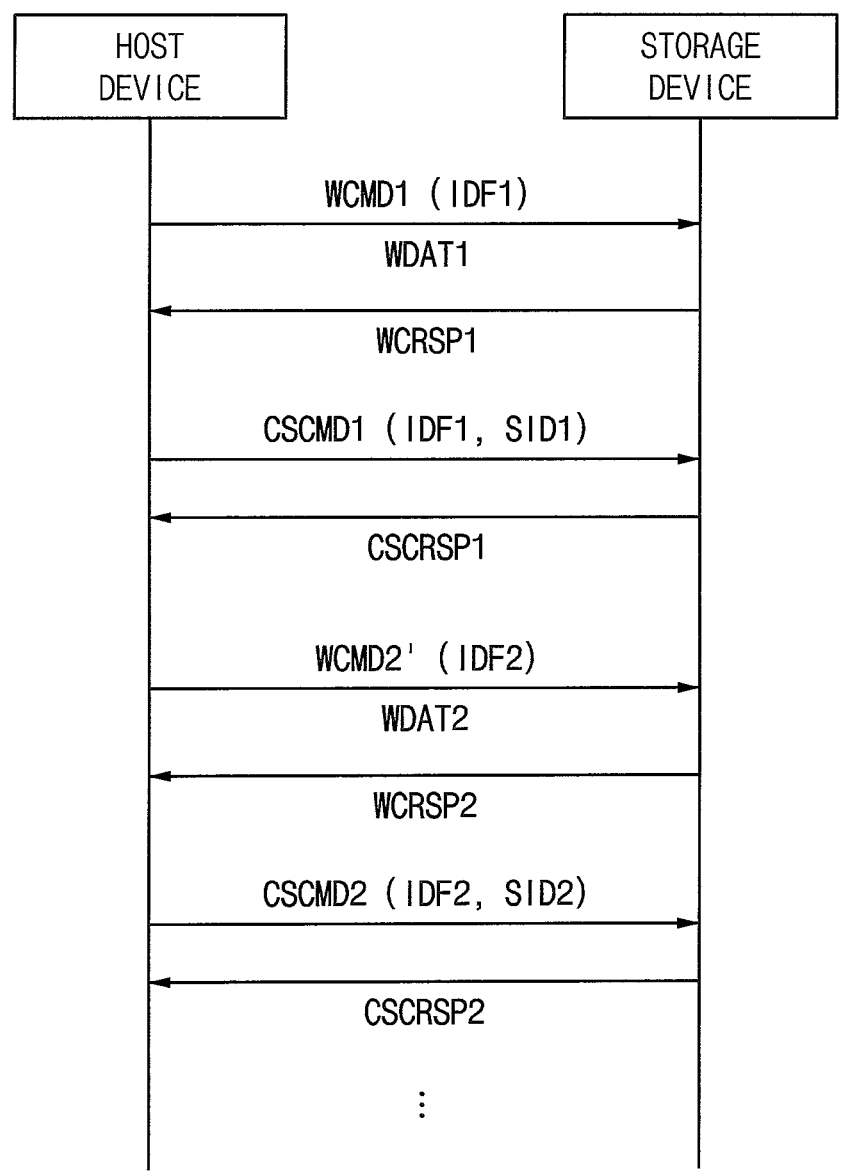
FIG. 26 is a diagram for describing operations of FIG. 25.

FIG. 26 is a diagram for describing operations of FIG. 25. The descriptions repeated with FIGS. 12 and 16 will be omitted.

Referring to FIGS. 2, 25 and 26, an example where the first attribute assignment command is the first confirmation stream command CSCMD1 and the second attribute assignment command is a second confirmation stream command CSCMD2 is illustrated. For convenience of illustration, the operation of receiving the identifier information request and the operation of outputting the information associated with the plurality of identifiers are omitted.

The storage device 300 may receive the first write command WCMD1 including the first identifier IDF1 and the first data WDAT1 from the host device 200, may process the first write command WCMD1, and may output the first write response WCRSP1 that represents the completion of processing the first write command WCMD1 to the host device 200. The storage device 300 may receive the first confirmation stream command CSCMD1 including the first identifier IDF1 and the first attribute SID1 from the host device 200, may process the first confirmation stream command CSCMD1, and may output the first response CSCRSP1 that represents the completion of processing the first confirmation stream command CSCMD1 to the host device 200.

The storage device 300 may receive a second write command WCMD2' including a second identifier IDF2 and second data WDAT2 from the host device 200, may process the second write command WCMD2', and may output a second write response WCRSP2 that represents a completion of processing the second write command WCMD2' to the host device 200. The storage device 300 may receive the second confirmation stream command CSCMD2 including the second identifier IDF2 and a second attribute SID2 from the host device 200, may process the second confirmation stream command CSCMD2, and may output a second response CSCRSP2 that represents a completion of processing the second confirmation stream command CSCMD2 to the host device 200.

Although FIGS. 23 and 24 illustrate that the write command is transmitted twice and the confirmation stream command is transmitted once, and although FIGS. 25 and 26 illustrate that the write command and the confirmation stream command are transmitted twice, respectively, example embodiments are not limited thereto, and the number of write commands and the number of confirmation stream commands may be variously changed according to example embodiments. When the write commands and the confirmation stream commands are provided, the attribute determination expectation identifier list, the attribute determination expectation stream information list and the attribute determination stream information list may be continuously maintained and updated, and thus the operation of setting the attribute of data that is already stored after the data write operation is completed may be efficiently implemented.

Although example embodiments are described in FIGS. 24 and 26 based on the confirmation stream command, example embodiments are not limited thereto, and the write command may be used as described with reference to FIGS. 20 through 22.

Figure 27:
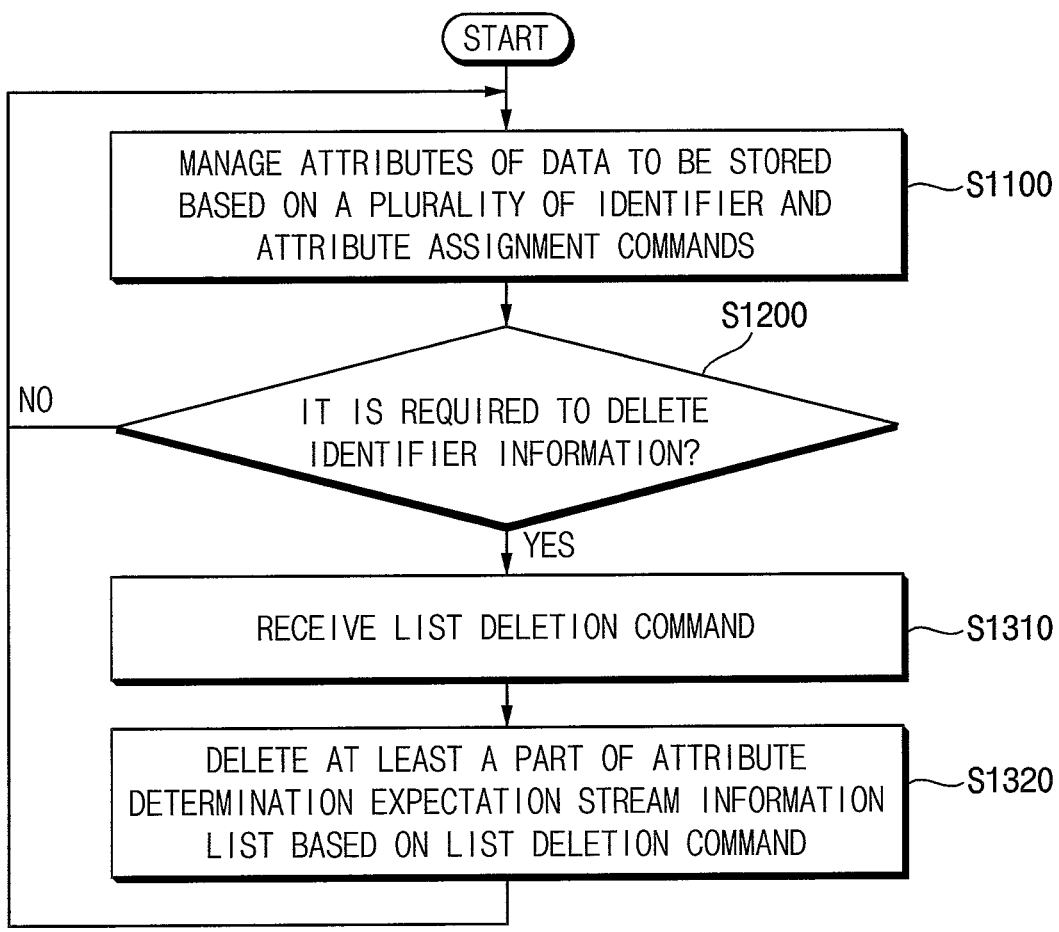
FIG. 27 is a flowchart illustrating a method of writing data in a storage device according to example embodiments.

FIG. 27 is a flowchart illustrating a method of writing data in a storage device according to example embodiments. The descriptions repeated with FIG. 1 will be omitted.

Referring to FIG. 27, in a method of writing data in a storage device according to example embodiments, the storage device manages attributes of data that are to be stored in the storage device based on a plurality of identifiers and attribute assignment commands that are used to assign a plurality of attributes to a plurality of data (operation S1100). For example, operation S1100 may be performed according to example embodiments described with reference to FIGS. 1 through 26.

The storage device determines whether it is required to delete the identifier information (operation S1200). For example, when there is no identifier supported by the storage device, e.g., when all of the plurality of identifiers are currently in use, it may be necessary to delete identifier information for at least one of the plurality of identifiers such that the at least one of the plurality of identifiers is usable. Alternatively, it may be necessary to delete identifier information for at least one of the plurality of identifiers for one of various other reasons.

In some example embodiments, as with operations S110 and S120 in FIG. 1, to perform operation S1200, the storage device may receive the identifier information request from the host device, and may output the information associated with the plurality of identifiers to the host device, while the storage device is operating or driving (e.g., during runtime, in real-time or online). The host device may select the identifier to delete the identifier information based on the information associated with the plurality of identifiers.

When it is required to delete the identifier information (operation S1200: YES), the storage device receives a list deletion command from the host device (operation S1310). The storage device may delete at least a part of the attribute determination expectation stream information list based on the list deletion command (operation S1320). For example, the list deletion command may be the confirmation stream command described with reference to FIG. 17.

After operation S1320 is performed and at least a part of the attribute determination expectation stream information list is deleted, or when it is not required to delete the identifier information (operation S1200: NO), operation S1100 according to example embodiments may be continuously performed.

Figure 28:
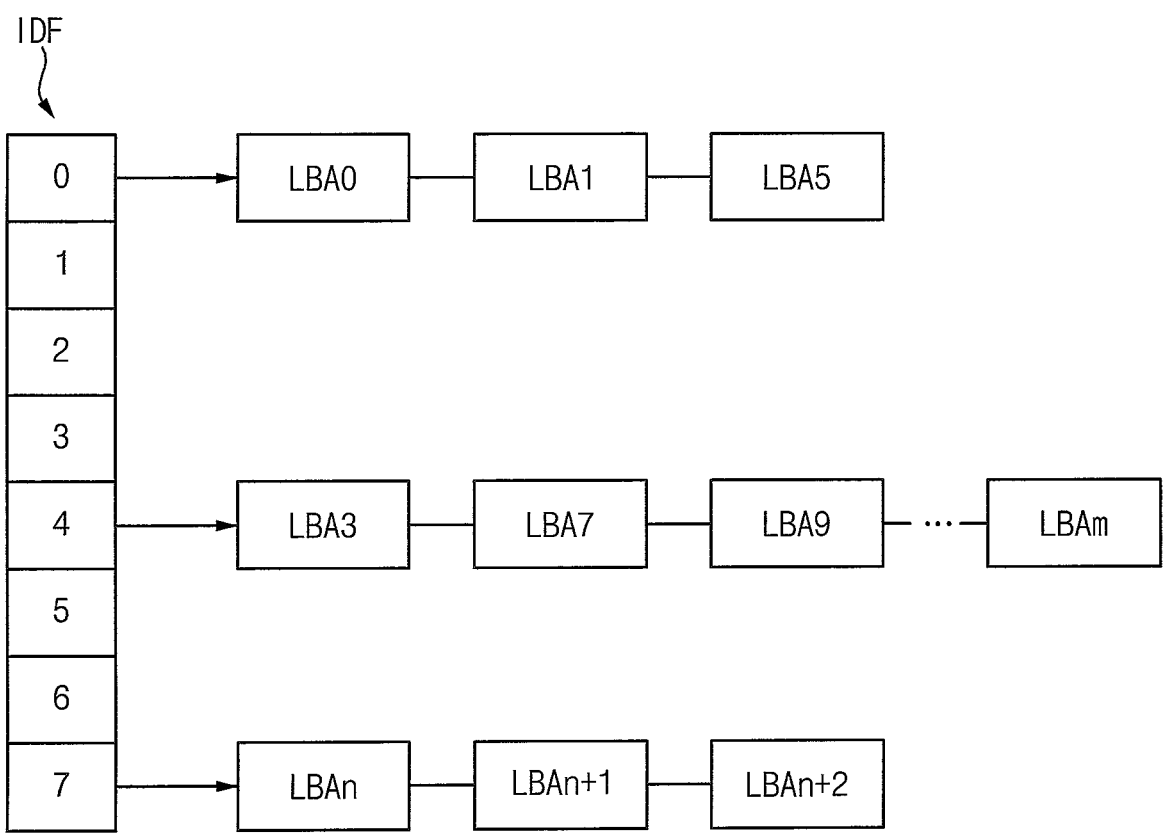
FIGS. 28, 29 and 30 are diagram for describing operations of FIG. 27.
Figure 29:
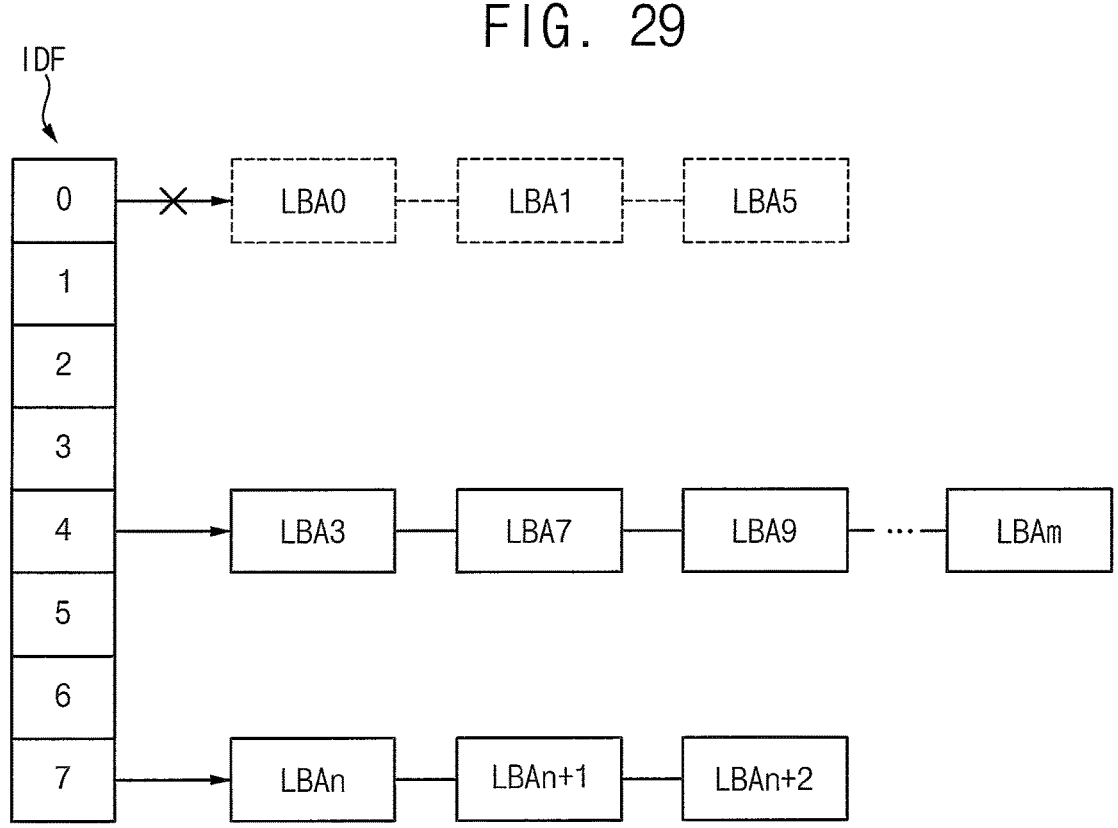
Figure 30:
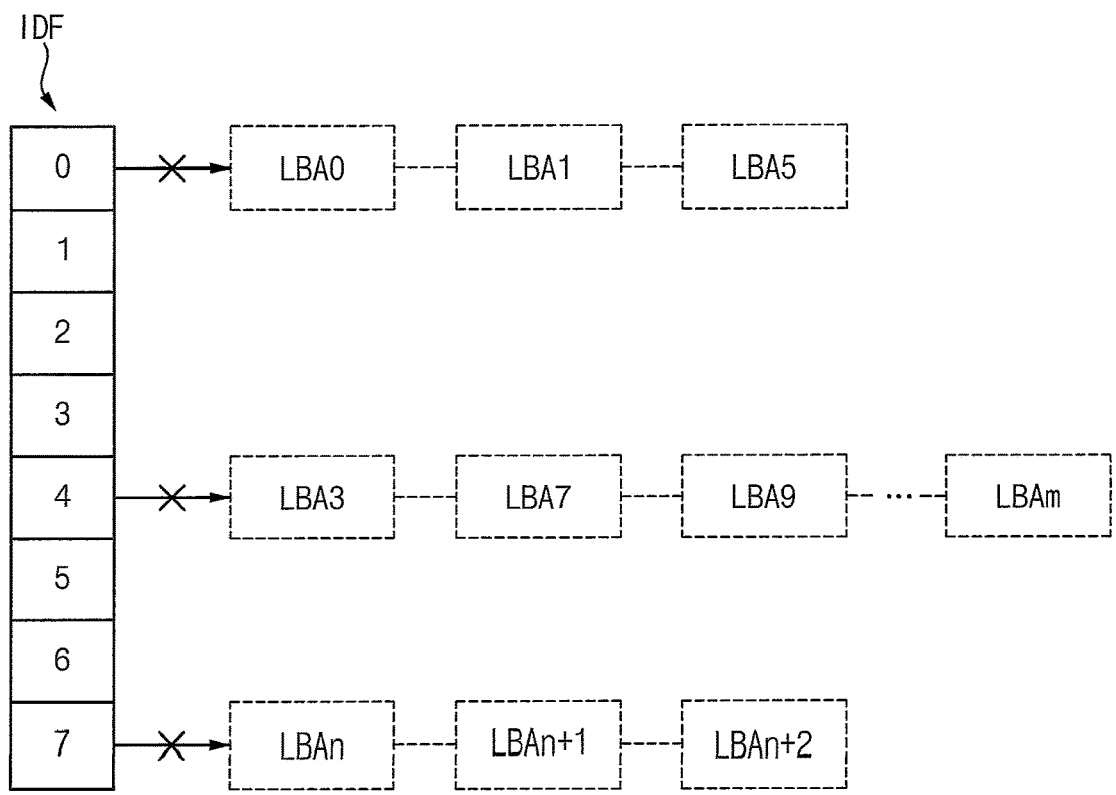

FIGS. 28, 29 and 30 are diagram for describing operations of FIG. 27.

Referring to FIG. 28, an example of a current state of the attribute determination expectation stream information list that is managed as operation S1100 in FIG. 27 is performed is illustrated.

As illustrated in FIG. 28, the plurality of identifiers IDF may include identifiers corresponding to numbers 0, 1, 2, 3, 4, 5, 6 and 7. In the attribute determination expectation stream information list, the logical addresses LBA0, LBA1 and LBA5 may be recorded to correspond to the number 0, the logical addresses LBA3, LBA7, LBA9 and LBAm may be recorded to correspond to the number 4, and the logical addresses LBAn, LBAn+1 and LBAn+2 may be recorded to correspond to the number 7. In the illustrated example, the identifiers 1, 2, 3, 5 and 6 are available and logical addresses may be recorded to correspond to these identifiers.

Referring to FIG. 29, an example where a part of the attribute determination expectation stream information list is deleted as operations S1310 and S1320 in FIG. 27 are performed is illustrated.

In some example embodiments, to perform operations S1310 and S1320, the field FR43 (e.g., the deletion mode field) in the confirmation stream command, which is the list deletion command, may be set to be enabled, and the identifier corresponding to the number 0 may be included in the field FR45 (e.g., the identifier field) in the confirmation stream command. When the list deletion command (e.g., the confirmation stream command) is received, the logical addresses LBA0, LBA1 and LBA5 corresponding to the number 0 may be deleted from the attribute determination expectation stream information list, as illustrated in FIG. 29.

As described above, the host device 200 may transmit the confirmation stream command as the list deletion command by setting the identifier to be deleted and the deletion mode field.

Referring to FIG. 30, an example where all of the attribute determination expectation stream information list is deleted as operations S1310 and S1320 in FIG. 27 are performed is illustrated.

In some example embodiments, to perform operations S1310 and S1320, the field FR42 (e.g., the all deletion mode field) in the confirmation stream command, which is the list deletion command, may be set to be enabled. When the list deletion command (e.g., the confirmation stream command) is received, all logical addresses LBA0, LBA1, LBA5, LBA3, LBA7, LBA9, LBAm, LBAn, LBAn+1 and LBAn+2 corresponding to all identifiers may be deleted from the attribute determination expectation stream information list, as illustrated in FIG. 30.

As described above, the host device 200 may transmit the confirmation stream command as the list deletion command by setting the all deletion mode field.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

The inventive concept may be applied to various electronic devices and systems that include the nonvolatile memory devices and the storage devices. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of writing data in a storage device, the method comprising:
receiving an identifier information request;
outputting information indicating a plurality of identifiers based on the identifier information request;
receiving a first write command and first data, the first write command comprising a first identifier among the plurality of identifiers;
performing a data write operation on the first data based on the first write command;
receiving a first attribute assignment command comprising the first identifier and a first attribute among a plurality of attributes; and
assigning the first attribute to the first data that is already stored in the storage device based on the first attribute assignment command,
wherein the first attribute of the first data is not set while the data write operation for the first data is performed, and
wherein the first attribute of the first data is set after the data write operation for the first data is completed and the first attribute assignment command is received.

2. The method of claim 1, wherein the first identifier in the first write command indicates an attribute of the first data is scheduled to be set after the data write operation for the first data is completed.

3. The method of claim 1, wherein the assigning the first attribute to the first data comprises recording a first logical address corresponding to the first identifier to an attribute determination stream information list such that the first logical address corresponds to the first attribute, and
wherein the attribute determination stream information list indicates a first relationship between the plurality of attributes and a first plurality of logical addresses to which the plurality of attributes are assigned.

4. The method of claim 3, wherein the assigning the first attribute to the first data further comprises deleting the first logical address from an attribute determination expectation stream information list such that the first logical address is not associated with the first identifier in the attribute determination expectation stream information list, and
wherein the attribute determination expectation stream information list indicates a second relationship between the plurality of identifiers and a second plurality of logical addresses to which the plurality of identifiers are assigned.

5. The method of claim 3, wherein the first attribute assignment command comprises a first confirmation stream command that is defined to have a field configuration different from that of the first write command and is used to assign the plurality of attributes to data.

6. The method of claim 5, wherein the first confirmation stream command comprises:
a confirmation mode field indicating an operation mode;
a stream identification (ID) field comprising a first stream ID indicating the first attribute; and
an identifier field comprising the first identifier.

7. The method of claim 3, wherein the first attribute assignment command comprises a second write command, and
wherein the first write command and the second write command have a common field configuration that is used to assign the plurality of attributes to data.

8. The method of claim 7, wherein the second write command comprises:
a stream mode field indicating an operation mode;
an identifier field comprising the first identifier; and
a group number field comprising a first stream ID indicating the first attribute.

9. The method of claim 1, wherein the performing the data write operation on the first data comprises:
storing the first data into a first region of the storage device corresponding to a first logical address; and
recording the first logical address of the first data to an attribute determination expectation stream information list such that the first logical address corresponds to the first identifier, and
wherein the attribute determination expectation stream information list indicates a relationship between the plurality of identifiers and a plurality of logical addresses to which the plurality of identifiers are assigned.

10. The method of claim 9, wherein the first identifier is indicated in an identifier field of the first write command.

11. The method of claim 1, wherein the receiving the identifier information request comprises:
receiving a first query request; and
receiving a second query request.

12. The method of claim 11, wherein the outputting information indicating the plurality of identifiers comprises:
outputting a maximum identifier number based on the first query request, the maximum identifier number representing a quantity of the plurality of identifiers supported by the storage device; and
outputting an attribute determination expectation identifier list based on the second query request, the attribute determination expectation identifier list comprising the plurality of identifiers and information indicating whether each of the plurality of identifiers is available.

13. The method of claim 1, further comprising:
receiving a list deletion command; and
deleting at least a part of an attribute determination expectation stream information list based on the list deletion command, the attribute determination expectation stream information list indicating a relationship between the plurality of identifiers and a plurality of logical addresses to which the plurality of identifiers are assigned.

14. The method of claim 13, wherein the list deletion command comprises a deletion mode field indicating an operation mode, and an identifier field indicating a second identifier, and
wherein only a logical address corresponding to the second identifier is deleted from the attribute determination expectation stream information list based on the list deletion command.

15. The method of claim 13, wherein the list deletion command comprises an all deletion mode field indicating whether to set an operation mode, and
wherein all logical addresses corresponding to each of the plurality of identifiers are deleted from the attribute determination expectation stream information list based on the list deletion command indicating the all deletion mode field is set.

16. The method of claim 1, further comprising:
receiving a second write command and second data, the second write command comprising the first identifier; and
performing a subsequent data write operation on the second data based on the second write command,
wherein the first attribute is simultaneously assigned to the second data and the first data that are already stored in the storage device based on the first attribute assignment command.

17. The method of claim 1, further comprising:
receiving a second write command and second data, the second write command comprising a second identifier among the plurality of identifiers;
performing a subsequent data write operation on the second data based on the second write command;
receiving a second attribute assignment command comprising the second identifier and a second attribute among the plurality of attributes; and
assigning the second attribute to the second data that is already stored in the storage device based on the second attribute assignment command.

18. A storage device comprising:
a plurality of nonvolatile memories; and
a storage controller configured to:
  receive an identifier information request from a host device that external to the storage device,
  output information, to the host device, indicating a plurality of identifiers based on the identifier information request,
  receive, from the host device, a first write command comprising a first identifier among the plurality of identifiers and first data,
  perform a data write operation on the first data based on the first write command,
  receive, from the host device, a first attribute assignment command comprising the first identifier and a first attribute among a plurality of attributes, and
  assign the first attribute to the first data that is already stored in the storage device based on the first attribute assignment command,
wherein the first attribute of the first data is not set while the data write operation for the first data is performed, and
wherein the first attribute of the first data is set after the data write operation for the first data is completed and the first attribute assignment command is received.

19. A method of writing data in a storage device, the method comprising:
receiving a first query request from a host device that is external to the storage device;
outputting a maximum identifier number to the host device based on the first query request, the maximum identifier number representing a quantity of a plurality of identifiers that are used in the storage device to assign a plurality of attributes to a plurality of data;
receiving a second query request from the host device;
outputting an attribute determination expectation identifier list to the host device based on the second query request, the attribute determination expectation identifier list comprising the plurality of identifiers and information indicating whether each of the plurality of identifiers is available;
receiving a first write command and first data from the host device, the first write command comprising a first identifier among the plurality of identifiers;
performing a data write operation to store the first data into a first region of the storage device corresponding to a first logical address based on the first write command;
recording the first logical address to an attribute determination expectation stream information list in association with the first identifier, the attribute determination expectation stream information list indicating a relationship between the plurality of identifiers and a plurality of logical addresses to which the plurality of identifiers are assigned;
receiving a subsequent command from the host device, the subsequent command comprising the first identifier and a first attribute among the plurality of attributes;
assigning the first attribute to the first data that is already stored in the storage device based on the subsequent command; and
deleting the first logical address from the attribute determination expectation stream information list,
wherein the first attribute of the first data is not set while the data write operation for the first data is performed,
wherein the first attribute of the first data is set after the data write operation for the first data is completed and the subsequent command is received, and
wherein the first identifier in the first write command indicates an attribute of the first data is scheduled to be set after the data write operation for the first data is completed.

* * * * *